United States Patent [19]
Futamura

[11] Patent Number: 5,910,947
[45] Date of Patent: Jun. 8, 1999

[54] MOBILE UNIT RADIO COMMUNICATIONS SYSTEM

[75] Inventor: Yoshisumi Futamura, Toyota, Japan

[73] Assignee: Toyota Jidosha Kabushiki Kaisha, Toyota, Japan

[21] Appl. No.: 08/712,378

[22] Filed: Sep. 11, 1996

[30] Foreign Application Priority Data

Sep. 12, 1995 [JP] Japan ................................. 7-234134

[51] Int. Cl.$^6$ ....................................................... H04B 7/26
[52] U.S. Cl. ......................... 370/332; 370/346; 455/437; 455/524
[58] Field of Search ................................... 370/312, 313, 370/328, 329, 331, 332, 335, 336, 346, 347, 338, 445, 337; 375/200; 455/31.1, 33.1, 33.2, 33.4, 436, 437, 438, 440, 442, 517, 524; 340/825.08

[56] References Cited

U.S. PATENT DOCUMENTS

| | | | |
|---|---|---|---|
| 5,274,841 | 12/1993 | Natarajan et al. | 455/33.4 |
| 5,448,569 | 9/1995 | Huang et al. | |
| 5,533,029 | 7/1996 | Gardner. | |
| 5,640,414 | 6/1997 | Blakeney, II et al. | 375/200 |
| 5,677,908 | 10/1997 | Oura | 370/331 |
| 5,745,855 | 4/1998 | Futamura | 455/524 |

FOREIGN PATENT DOCUMENTS

| | | |
|---|---|---|
| 64-9508 | 1/1989 | Japan. |
| 3-243026 | 10/1991 | Japan. |
| 5-168059 | 7/1993 | Japan. |
| 5-252089 | 9/1993 | Japan. |
| 6-237212 | 8/1994 | Japan. |

Primary Examiner—Chau Nguyen
Attorney, Agent, or Firm—Oblon, Spivak, McClelland, Maier & Neustadt, P.C.

[57] ABSTRACT

A mobile station (14) carrier-senses the radio wave receiving levels sent from a plurality of base stations (12) and informs a master station (10) of the result via a base station (12) which has jurisdiction over that mobile station (14). The master station (10) determines the next base station (12) with which a mobile station (14) should execute communication according to the carrier sense results of a plurality of base stations (12) from each mobile station (14). Consequently, the master station (10) learns with which base station (12) each of the mobile stations (14) can execute communication and the master station (10) determines the next base station (12) to have jurisdiction over a mobile station (14) so that there is no disparity between the numbers of mobile stations (14) over which each base station (12) has jurisdiction. Thus, disparity in the numbers of mobile stations (14) under the jurisdiction of the base stations (12) can be corrected while effectively switching the jurisdiction of the mobile stations (14). Moreover, carrier sensing of radio waves from a mobile station (14) may be executed at a base station (12) instead of at a mobile station (14).

17 Claims, 30 Drawing Sheets

SIGNAL a

| FRAME START | SELECTED BASE FRAME NO. (MASTER NO.) | INSTRUCTION CHANNEL NO. | MOBILE STATION NO. | INCOMING OUTGOING FLAG | DATA | FRAME END |

SIGNAL b

| FRAME START | INSTRUCTION CHANNEL NO. | MOBILE STATION NO. | INCOMING OUTGOING FLAG | DATA | FRAME END |

SIGNAL c

| FRAME START | SENSE CHANNEL NO. | SENSE VALUE | MOBILE STATION NO. | INCOMING OUTGOING FLAG | REGION NO. | DATA | FRAME END |

SIGNAL d

| FRAME START | RECEIVING BASE STATION NO. | SENSE CHANNEL NO. | SENSE VALUE | MOBILE STATION NO. | INCOMING OUTGOING FLAG | REGION NO. | DATA | FRAME END |

Fig. 4

CHANNEL SETTING TABLE

| CHANNEL NO. | | f1 | f2 | f3 | f4 | f5 | f6 |
|---|---|---|---|---|---|---|---|
| BASE STATION NO. | MASTER NO. | #1 | #2 | #3 | #4 | #5 | #6 |
| | SUB NO. | | | | | | |
| ALLOCATION METHOD | | 2 | 2 | 2 | 2 | 2 | 1 |

1: MAXIMUM SENSE VALUE   2: LEVELLED

Fig. 5(A)

SETTING TABLES

| REGION NO. | | 1 | 2 |
|---|---|---|---|
| BASE STATION NO. | MASTER NO. | #3 | #4 |
| | SUB NO. | | |

BASE STATION REGISTRATION TABLE

| MOBILE STATION NUMBER | RECEIVING BASE STATION NUMBER | REQUESTED BASE STATION NUMBER |
|---|---|---|
| %1 | #1 | #1 |
| %2 | #6 | #6 |
| %3 | #2 | #2 |
| %4 | #3 | #3 |
| %5 | #4 | #4 |
| %6 | #5 | #5 |

Fig. 6(B)

POLLING REGISTRATION TABLE

| RECEIVING BASE STATION NO. (MASTER NO.) | #1 | | #2 | | #3 | | #4 | | #5 | | #6 | |
|---|---|---|---|---|---|---|---|---|---|---|---|---|
| PROCESSING SPECIFICATION HEAD FLAG | 0 | | 0 | | 1 | | 0 | | 0 | | 0 | |
| | MOBILE STATION NO. | POLLING FLAG | MOBILE STATION NO. | POLLING FLAG | MOBILE STATION NO. | POLLING FLAG | MOBILE STATION NO. | POLLING FLAG | MOBILE STATION NO. | POLLING FLAG | MOBILE STATION NO. | POLLING FLAG |
| | %1 | 1 | %3 | 1 | %4 | 1 | %5 | 1 | %6 | 1 | %2 | 1 |

Fig. 6(C)

POLLING SPECIFICATION TABLE

| SELECTED BASE STATION NO. (MASTER NO.) | #1 | #2 | #3 | #4 | #5 | #6 |
|---|---|---|---|---|---|---|
| MOBILE STATION NO. | %1 | %3 | %4 | %5 | %6 | %2 |

| MOBILE STATION NUMBER | SENSE CHANNEL | | | | | | DISTRIBUTION STATE |
|---|---|---|---|---|---|---|---|
| | f1 | f2 | f3 | f4 | f5 | f6 | |
| %1 | 200 | 0 | 0 | 0 | 0 | 80 | 2 |
| %2 | 0 | 140 | 0 | 0 | 0 | 150 | 2 |
| %3 | 0 | 160 | 0 | 0 | 0 | 110 | 2 |
| %4 | 0 | 90 | 230 | 180 | 0 | 0 | 3 |
| %5 | 0 | 0 | 170 | 210 | 110 | 0 | 3 |
| %6 | 0 | 0 | 120 | 150 | 190 | 0 | 2 |

Fig. 7(A)

| MOBILE STATION NUMBER | SENSE CHANNEL | | | | | | DISTRIBUTION STATE |
|---|---|---|---|---|---|---|---|
| | f1 | f2 | f3 | f4 | f5 | f6 | |
| %1 | 200 | 0 | 0 | 0 | 0 | 80 | 2 |
| %2 | 0 | 170 | 0 | 0 | 0 | 150 | 1→2 |
| %3 | 0 | 160 | 0 | 0 | 0 | 110 | 2 |
| %4 | 0 | 90 | 230 | 180 | 0 | 0 | 3 |
| %5 | 0 | 0 | 170 | 210 | 110 | 0 | 3 |
| %6 | 0 | 0 | 120 | 150 | 190 | 0 | 2 |

Fig. 7(B)

| MOBILE STATION NUMBER | SENSE CHANNEL | | | | | | DISTRIBUTION STATE |
|---|---|---|---|---|---|---|---|
| | f1 | f2 | f3 | f4 | f5 | f6 | |
| %1 | 200 | 0 | 0 | 0 | 0 | 80 | 2 |
| %2 | 0 | 170 | 0 | 0 | 0 | 150 | 1→2 |
| %3 | 0 | 160 | 0 | 0 | 0 | 180 | 1→2 |
| %4 | 0 | 90 | 230 | 180 | 0 | 0 | 3 |
| %5 | 0 | 0 | 170 | 210 | 110 | 0 | 3 |
| %6 | 0 | 0 | 120 | 150 | 190 | 0 | 2 |

Fig. 7(C)

CARRIER SENSE VALUE REGISTRATION TABLE

BASE STATION REGISTRATION TABLE AT START-UP

| MOBILE STATION NUMBER | RECEIVING BASE STATION NUMBER | REQUESTED BASE STATION NUMBER | | | | |
|---|---|---|---|---|---|---|
| %1 | #1 | #2 | #3 | #4 | #5 | #6 |
| %2 | #1 | #2 | #3 | #4 | #5 | #6 |
| %3 | #1 | #2 | #3 | #4 | #5 | #6 |
| %4 | #1 | #2 | #3 | #4 | #5 | #6 |
| %5 | #1 | #2 | #3 | #4 | #5 | #6 |
| %6 | #1 | #2 | #3 | #4 | #5 | #6 |

| BASE STATION NO. (MASTER NO.) | ADJACENT BASE STATION NO. (MASTER NO.) | | | |
|---|---|---|---|---|
| # 1 | # 2 | # 6 | | |
| # 2 | # 1 | # 3 | # 6 | |
| # 3 | # 2 | # 4 | | |
| # 4 | # 3 | # 5 | | |
| # 5 | # 3 | # 4 | | |
| # 6 | # 1 | # 2 | # 3 | |

BASE STATION DISTRIBUTION TABLE

Fig. 25

POLLING SPECIFICATION TABLE

| SELECTED BASE STATION NO. (MASTER NO.) | #1 | #2 | #3 | #4 | #5 | #6 |
|---|---|---|---|---|---|---|
| MOBILE STATION NO. | %1 | %3 | %4 | %5 | %6 | %2 |
| SENSE CHANNEL NO. | f6 | f3 | f3 | f3 | f4 | f6 |
| SENSING MOBILE STATION NO. | %2 | %4 | %4 | %4 | %5 | %2 |

F0 INDICATES NO SENSING. AT SUCH TIMES, THE SENSING MOBILE STATION NUMBER IS DEEMED TO BE %0.

Fig. 26

| MOBILE STATION NUMBER | BASE STATION NUMBER ||||||  DISTRIBUTION STATE |
|---|---|---|---|---|---|---|---|
| | #1 | #2 | #3 | #4 | #5 | #6 | |
| %1 | 200 | 0 | 999 | 999 | 999 | 80 | 2 |
| %2 | 0 | 140 | 999 | 999 | 999 | 150 | 2 |
| %3 | 0 | 160 | 999 | 999 | 999 | 110 | 2 |
| %4 | 999 | 90 | 230 | 180 | 999 | 999 | 3 |
| %5 | 999 | 999 | 170 | 210 | 110 | 999 | 3 |
| %6 | 999 | 999 | 120 | 150 | 190 | 999 | 2 |

Fig. 27(A)

| MOBILE STATION NUMBER | BASE STATION NUMBER ||||||  DISTRIBUTION STATE |
|---|---|---|---|---|---|---|---|
| | #1 | #2 | #3 | #4 | #5 | #6 | |
| %1 | 200 | 0 | 999 | 999 | 999 | 80 | 2 |
| %2 | 0 | 170 | 0 | 999 | 999 | 150 | 1→2 |
| %3 | 0 | 160 | 0 | 999 | 999 | 110 | 2 |
| %4 | 999 | 90 | 230 | 180 | 999 | 999 | 3 |
| %5 | 999 | 999 | 170 | 210 | 110 | 999 | 3 |
| %6 | 999 | 999 | 120 | 150 | 190 | 999 | 2 |

Fig. 27(B)

| MOBILE STATION NUMBER | BASE STATION NUMBER ||||||  DISTRIBUTION STATE |
|---|---|---|---|---|---|---|---|
| | #1 | #2 | #3 | #4 | #5 | #6 | |
| %1 | 200 | 0 | 999 | 999 | 999 | 80 | 2 |
| %2 | 0 | 170 | 0 | 999 | 999 | 150 | 1→2 |
| %3 | 0 | 160 | 0 | 999 | 999 | 180 | 1→2 |
| %4 | 999 | 90 | 230 | 180 | 999 | 999 | 3 |
| %5 | 999 | 999 | 170 | 210 | 110 | 999 | 3 |
| %6 | 999 | 999 | 120 | 150 | 190 | 999 | 2 |

Fig. 27(C)

MOBILE UNIT RADIO COMMUNICATIONS SYSTEM

BACKGROUND OF THE INVENTION

1. Field of the Invention

The present invention relates generally to a mobile communications system for carrying out communications according to a polling system carried out by one master station between a plurality of mobile stations via a plurality of base stations.

2. Description of the Prior Art

In recent years, unmanned work mechanization has been increasing in a variety of fields and in particular many factory operations are being automated. In response to requests for such factory automation, an unmanned vehicle system has been developed for automatically carrying out operations such as transportation of goods by unmanned vehicles. In this unmanned vehicle system a master station is provided for managing a plurality of unmanned vehicles, mobile unit radio communication is carried out between this master station and the unmanned vehicles, and the movement of the unmanned vehicles is thus controlled.

A variety of communications systems exist for this type of mobile unit radio communication, one being an IEC system based on Draft SC65C of the International Electrotechnical Commission. In this IEC system, a plurality of base stations are connected by cables to a master station and radio communication is carried out by a polling system (system whereby mobile stations execute transmission at a timing specified by the master station) between a plurality of base stations and a plurality of mobile stations. In addition, in this system the mobile stations managed by one base station are allocated in advance and all base stations carry out polling in a parallel operation, thus speeding up response time.

However, the abovementioned prior art has the problem that the possible mobility range of the mobile stations is restricted since the mobile stations to be managed by the base stations are determined in advance. In other words, if base stations are positioned at a distance from one another the range of manageable mobile stations of the entire system increases while, if the mobile stations managed by each base station are fixed, communication will not be possible when a mobile station moves away from the base station which has jurisdiction over it. In order to increase the level of freedom of the system it would be better if the mobile stations managed by the base stations were not fixed.

In Japanese Patent Application No. Hei 6-202175 the present applicant presented a system for carrying out replacement of a base station wherein a mobile station determines the base station to which it should transmit. According to that system, replacement of a base station with jurisdiction to accompany the movement of a mobile station could be smoothly carried out.

However, depending on the system, there are cases in which the number of mobile stations becomes considerable and a multiplicity of mobile stations is concentrated in the jurisdiction area of a single base station. Hence the problems that since communication via a base station is carried out in sequence to the mobile stations over which that base station has jurisdiction, the incidence of the communications diminishes and the time taken for a single communication to make one tour (namely the time taken to complete polling communication with all the mobile stations) increases.

Therefore it is envisaged that when mobile stations are concentrated at one base station, jurisdiction over these mobile stations may be possible at another base station and, in a case in which the relevant other base station is serving only a small number of mobile stations, it would be preferable to transfer a portion of the mobile stations to the jurisdiction of this other base station.

SUMMARY OF THE INVENTION

The present invention is based on the abovementioned opinion and it is the object of the present invention to provide a mobile unit radio communications system wherein there is no disparity in the number of mobile stations served by base stations used for executing communication with mobile stations.

The present invention is a mobile unit communications system wherein a master station and a plurality of mobile stations in a polling system execute communications via a plurality of base stations and a base station executes communications to a mobile station positioned within the area over which the base station has jurisdiction, characterized in that a mobile station detects receiving states of radio waves sent from a plurality of base stations and transmits the detected result to a master station via a base station and a master station determines a base station to be used for communications with each mobile station based on the receiving state of each mobile station sent to the master station from each mobile station.

Thus the master station can learn in which state each mobile station can receive radio waves from a plurality of base stations. Therefore, assigning to which base station a mobile station should execute communication can be correctly carried out at the master station. There are also many cases in which a mobile station is capable of executing communication to a plurality of base stations. The master station can here replace the base station with which a mobile station is executing communication with another base station to which the mobile station is capable of executing communication. Consequently, in a case where a mobile station has been assigned to a base station with the strongest receiving radio wave level, it is possible to perform level assigning for instance, in a case in which a mobile station has become separated from a specified base station. Therefore, in a polling communications system, the time taken by the master station to complete communications to all the mobile stations can be shortened by implementing levelling processing.

Moreover, another aspect of the present invention is a mobile unit communications system wherein a master station and a plurality of mobile stations execute communications in a polling system through a plurality of base stations and a base station executes communications to a mobile station positioned within the area over which the base station has jurisdiction, characterized in that a base station detects receiving states of radio waves sent from a plurality of mobile stations and transmits the detection result to the master station and the master station determines a base station to be used for communication with a mobile station based on a radio wave receiving state of each mobile station sent from each base station.

Thus, according to this aspect, the receiving state of radio waves from a mobile station is detected at a base station. The detection of the receiving state of radio waves from a base station at a mobile station and the detection of the receiving state of radio waves from a mobile station at a base station are identical since the communication state between the two is detected. Therefore, by obtaining the detection result at the master station, levelling processing can be carried out in the same way as in the case described above. In addition, since the number of base stations is usually less than the number of mobile stations in a normal communications system, there are more cases in which it is more effective for each base station to have a carrier sense function (radio wave receiving state detection function) than for each mobile station to have a carrier sense function. Moreover, since carrier sensing in the second aspect of the present invention is carried out by receiving radio waves from a mobile station, carrier sensing may be carried out exclusively at a base station for which there is no mobile station to which communication can be executed and thus there is no need to transmit to non-existent mobile stations. In other words, since carrier sensing in the first aspect of the invention is carried out at a mobile station by receiving radio waves from each base station, it is necessary to transmit even to base stations which have no mobile unit communicators.

A further aspect of the present invention is characterized in that a master station executes levelling among base stations used for communications with mobile stations so that there is no disparity in the number of mobile stations served by each base station and determines a base station to be used.

BRIEF DESCRIPTION OF THE DRAWINGS

FIG. 4 is an explanatory diagram depicting signal frame configurations used in a polling communication.

FIGS. 5(A) and 5(B) are explanatory diagrams showing a table for channel setting forming a setting table and the contents of a region setting table respectively.

FIGS. 6(A), 6(B) and 6(C) are explanatory diagrams depicting a base station registering table, a polling registration table and a polling specification table respectively.

FIGS. 7(A), 7(B) and 7(C) are explanatory diagrams depicting the configurations of a carrier sense value registration table.

FIG. 25 is an explanatory diagram depicting the contents of a base station distribution table forming a setting table.

FIG. 26 is a diagram depicting the content of a polling specification table forming a control table.

FIGS. 27(A), 27(B) and 27(C) are explanatory diagrams showing the configurations of a carrier sense value registration table.

DESCRIPTION OF THE PREFERRED EMBODIMENTS

The preferred embodiments of the present invention will now be explained based on the diagrams.

EMBODIMENT 1

System Configuration

Figure 1:
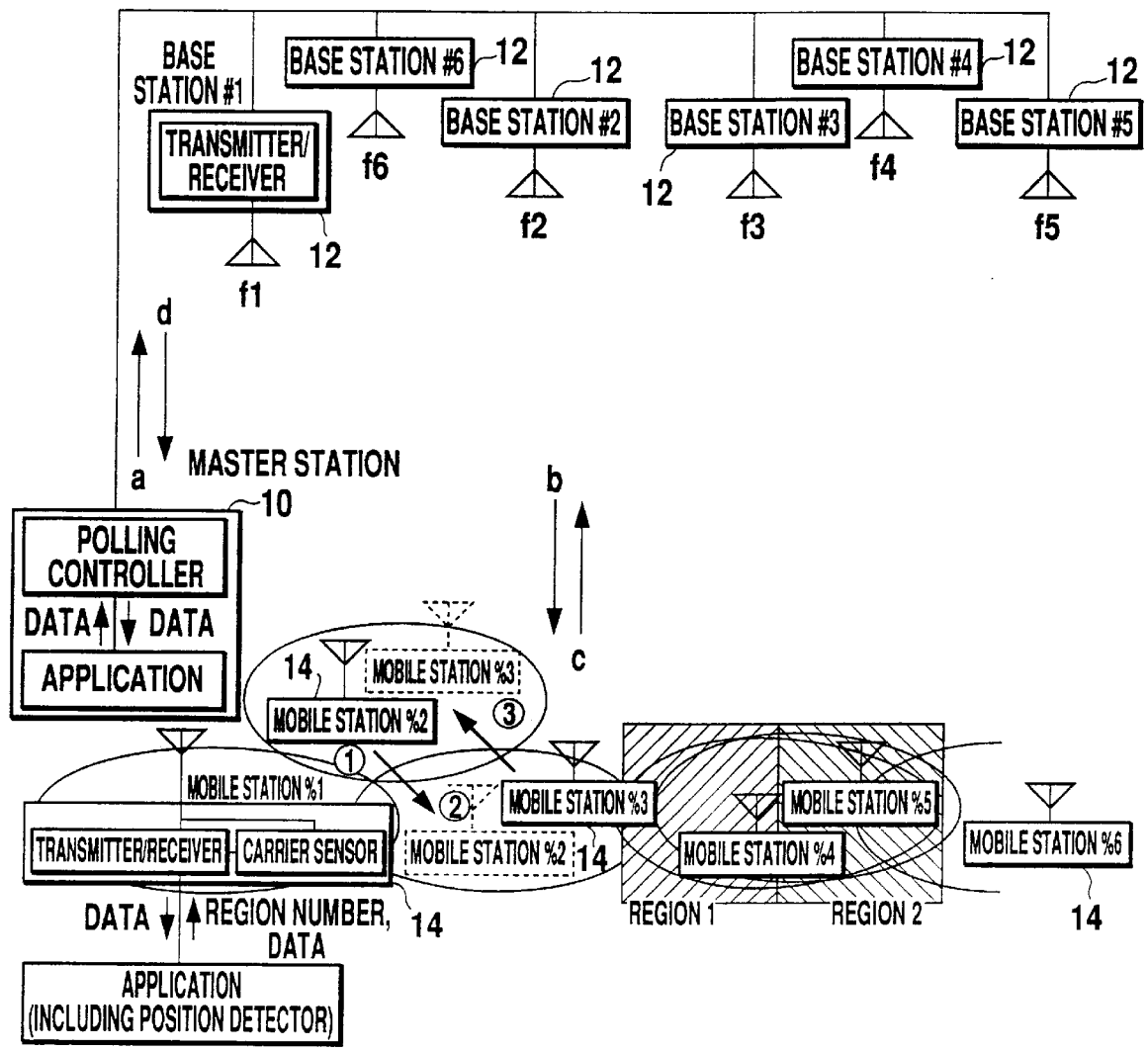
FIG. 1 is a block diagram depicting a complete configuration of a system in a first embodiment.
Figure 2A:
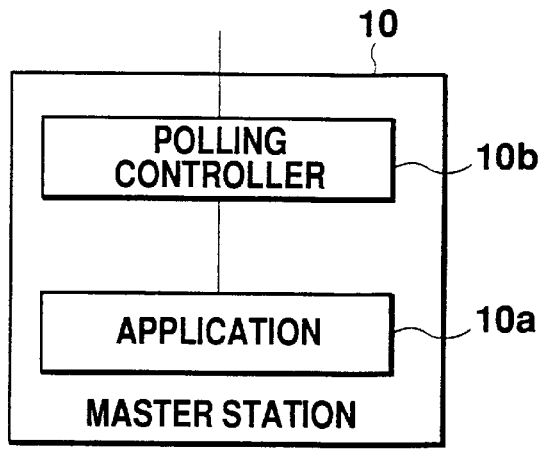
FIGS. 2(A), 2(B) and 2(C) are block diagrams showing the configurations of a master station, a base station and a mobile station respectively.
Figure 2B:
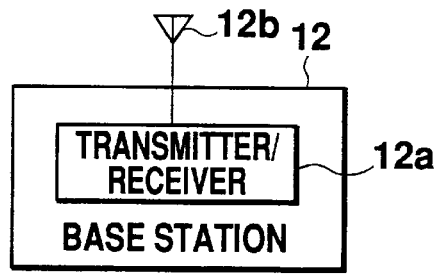
Figure 2C:
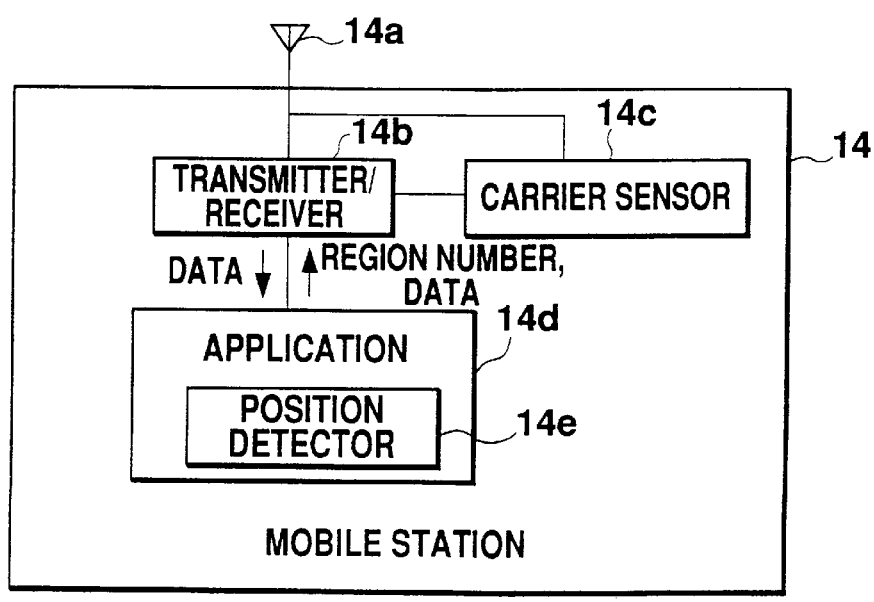

FIGS. 1~2 are block diagrams depicting, respectively, a complete configuration of a system in a first embodiment (FIG. 1), a configuration of a master station (FIG. 2(A)), a configuration of a base station (FIG. 2(B)) and a configuration of a mobile station (FIG. 2(C)). As FIG. 1 shows, a plurality of base stations 12 (Nos. #1~#6 are shown in this diagram) are connected by communications lines at a master station. In this system a plurality of mobile stations 14 (Nos. %1~%6 are shown in this diagram) are provided and these mobile stations 14 carry out radio communications between any of the base stations 12.

As FIG. 2 (A) shows, a master station 10 has an application 10a and a polling controller 10b. Designated data is transmitted through the polling controller 10b and data received at the polling controller 10b is decoded by the application 10a by implementing a program at the application 10a. Moreover as FIG. 2 (B) shows, each base station 12 has both a transmitter/receiver 12a and an antenna 12b and, in addition to transmitting data supplied by the master station 10 through the transmitter/receiver 12a from the antenna 12b, each base station 12 also transfers data received at an antenna 12b through a transmitter/receiver 12a to the master station 10. In this example each of the base stations 12 has been allocated with 1 fixed frequency channel and the channel frequencies of base stations #1~#6 are shown at f1~f6 respectively.

As FIG. 2 (C) shows, a mobile station 14 has an antenna 14a, a transmitter/receiver 14b, a carrier sensor 14c and an application 14d. A signal received by an antenna 14a is sent by a transmitter/receiver 14b to an application 14d where it is then decoded.

An application 14d includes a position detector 14e and data obtained here (for instance a region number of a region in which a mobile station is present for showing the position of the mobile station) is sent by a transmitter/receiver 14b from an antenna 14a and is received at a base station 12.

Moreover, a carrier sensor 14c detects (carrier-senses) the signal level of a radio wave received with the antenna 14a and sends it to the transmitter/receiver 14b. Since the transmission frequencies of all the base stations 12 are different, the carrier sensor 14c detects the reception signal level of every base station 12 by detecting the signal level of a received radio wave for each specific frequency.

Figure 3:
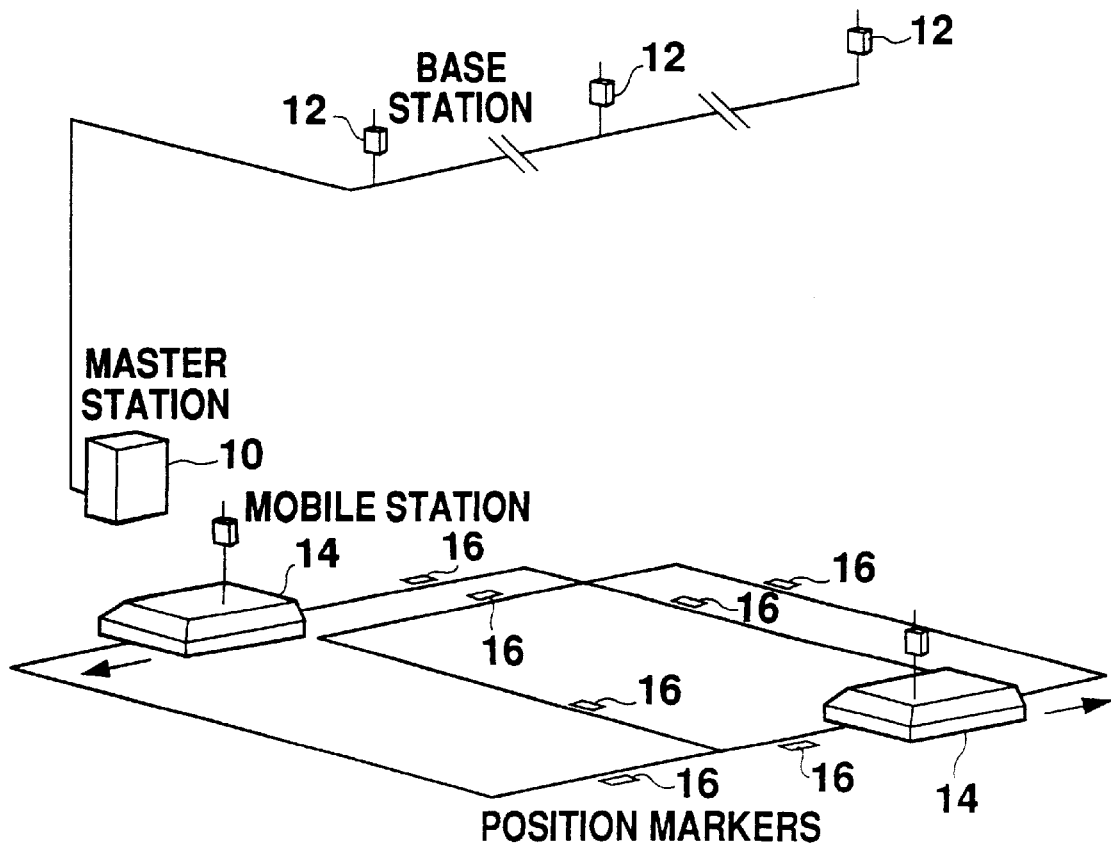
FIG. 3 is a schematic diagram depicting an external view of the system.

FIG. 3 is a schematic diagram depicting an external view of a system in which base stations 12 are connected to a master station 10 by cables. Mobile stations 14 move in a designated path and position markers 16 are provided at designated intervals on each path. Each mobile station 14 detects these position markers 16 with a position detector 14e and thus detects its own position (region number).

For the position markers 16, the plurality of base stations 12 should preferably be positioned relatively close together, with the position markers 16 provided at places where it is difficult to judge from the radio wave reception levels from the plurality of base stations 12 which base station 12 should be chosen.

According to this type of configuration, the master station 10 sends a variety of data to each of the mobile stations 14 in order to control the movement and halting of the mobile stations 14 and to carry out other types of control. Meanwhile each mobile station 14 supplies its own movement data and data concerning its position (for instance a region number) to the master station 10. Thus, designated movement control of the mobile stations can be carried out.

A single base station 12 can here serve a plurality of mobile stations 14 and, in such a case, communication to the mobile stations 14 served by the base station 12 is carried out in sequence. When the number of mobile stations 14 served by one base station 12 increases, the time taken for one sequence of communications to be carried out to all the mobile stations 14 is lengthened. Alternatively, if the base stations 12 are positioned in close proximity to each other, the number of base stations 12 which can carry out communications satisfactorily to a mobile station 14 may also be a plurality. In such a case, it is envisaged that a more effective system can be constructed by changing the base station to which a mobile station 14 communicates and by levelling the number of mobile stations served by each base station. In the present example, a mobile station 14 detects (executes carrier-sensing to) the reception states (signal levels) of radio waves from a plurality of base stations 12 and informs the master station 10 of the detection result. Then, at the master station 10, the carrier sense result of each mobile station 14 and the number of mobile stations 14 served by each base station 12 are obtained as usual and the mobile stations 14 served by each base station are determined so that there is no disparity in the number of mobile stations 14 served by each base station 12.

The base stations 12 can here carry out a designated group division. Broadcast communication is then carried out to a plurality of mobile stations within the group. For instance, for base station No. #1, in a case in which a group has been established for carrying out broadcast communication, #1-1, #1-2, . . . are provided as the numbers of the base station 12. The number to the left of the dash - is termed a master number and that on the right is termed a sub-number; the master number indicates the group number.

Then, in a case in which a polling communication is executed from the master station 10 to a mobile station within this group, the master station 10 specifies the master number of the base station 12 and the number of the mobile station 14 as an address and executes polling transmission.

As a result, a plurality of base stations 12 specified with master numbers transmit the same signal to a mobile station 14. Therefore, all mobile stations 14 within the group receive the polling transmission data for 1 mobile station 14. The mobile station 14 which has been designated as the address returns a polling reply to the master station 10 through the base stations 12 specified as far as the sub-number governing the mobile station 14 itself.

According to this type of system data such as emergency halt data can be transmitted to all the mobile stations 14 within a group and all the mobile stations 14 within the group execute emergency halt or the like in accordance with this instruction, thus achieving broadcast communication.

Signal Frame Configuration

In signal frame configurations of signals a~d in FIG. 4, a signal sent from a master station 10 to each base station 12 is shown at signal a, a signal sent from each base station 12 to each mobile station 14 at signal b, a signal sent from each mobile station 14 to each base station 12 at signal c, and a signal sent from each base station 12 to the master station 10 at signal d.

Thus, signal a consists of frame start, a selected base station number (master number), a specified channel number, a mobile station number, an outgoing/incoming flag, data and a frame end. Frame start is data which indicates the start of the signal, a selected base station number is data specifying from which base station signal a should be sent, a specified channel number is data indicating a channel to be used at a mobile station (for instance the frequency band to be used etc.), a mobile station number is data specifying the mobile station which is to receive and return transmissions, an outgoing/incoming flag is data showing whether this signal is data which has been sent from the master station or data to be received by the master station, data is data showing information such as a parameter concerning movement, frame end is data indicating the end of signal a.

Next, in signal b, in contrast to signal a, the selected base station number has been deleted. This is because this signal is sent from the base station specified in signal a and therefore there is no need for data concerning the selected base station which has already been specified.

Signal c consists of frame start, a sense channel number, a sense value, a mobile station number, an outgoing/incoming flag, a region number, data and a frame end. A frame start is data showing the start of a signal in the same manner as an incoming signal, a sense channel is data concerning a channel (frequency) which has executed carrier sensing at the mobile station, a sense value is data indicating the channel reception level namely the result of the carrier sensing, a mobile station number is data for specifying the mobile station itself, an outgoing/incoming flag is data showing whether this signal is an outgoing signal or an incoming signal as described above, a region number is data showing the position of the mobile station, data is data showing all types of information such as movement of the mobile station and a frame end is data indicating the end of signal c. Finally, though in signal d a receiving base station number has been added, the other data are identical with those in signal c. Therefore the master station receives signal d and is able to specify from which base station this data and the various types of data from the mobile station have been sent.

From the response from the mobile station, the master station can then learn the carrier sense result of one of the mobile station's channels. Therefore, since the mobile station sequentially transmits the carrier sense results of the radio waves from every base station (i.e., every channel), it is usually possible to learn at the master station which base stations can be used to serve that mobile station.

Setting Table

The master station here has a setting table set beforehand as shown in FIGS. 5 (A) and (B). This setting table is set according to the following conditions.

(1) Base station numbers are unique to each base station. In other words, one base station number is allocated to one base station. An exception is when the same channel is being used, in which case the base stations may have the same number during operation. However, in this case, these base stations will carry out broadcast polling on an identical channel.

(2) A plurality of base station numbers may be used on the same channel (normally a frequency band) provided that the distances between them are sufficient to avoid interference. This is in order to avoid interference even if base stations physically separated at greater distances than are designated carry out communications using the signal of the same channel.

(3) Base stations having the same master number in their base station numbers carry out broadcast polling. In other words, in signal a shown in FIG. 4, since only the master number has been specified, all base stations with the same master number carry out polling transmission. All mobile stations positioned under the jurisdiction of this plurality of base stations can receive transmission data. Therefore, controls such as emergency halt to a plurality of mobile stations can be carried out by implementing broadcast polling. Here, only the mobile station 14 specified in signal a returns a polling reply.

(4) One base station number corresponds to one region number. This is because a region number is data for specifying the position of a mobile station and at no time do two or more base stations have jurisdiction over the same position.

(5) One base station number may be used with a plurality of region numbers. This is because it is assumed that one base station has jurisdiction over a designated region and there may be a plurality of region numbers for specifying the position of a mobile station within this jurisdiction region.

As FIG. 5 (A) shows, in compliance with these conditions, a table of base station numbers corresponding to channel numbers is stored at the master station. In addition, data concerning the distinction between the allocation methods for each of the channels is also stored. Distinction [1] refers to a channel which does not undergo levelling in which the base station 12 with the greatest sense value is selected, distinction [2] refers to a channel which does undergo levelling. As explained above, processing is carried out at a distinction [2] channel to level the mobile stations served by the channel.

In addition, data concerning both base stations numbers corresponding to region numbers is stored as shown in FIG. 5 (B).

Control Tables

In addition, the master station 10 has a base station registration table, a polling registration table and a polling specification table in order to control the polling sequence as shown in FIGS. 6 (A), (B) and (C) respectively.

The base station registration table consists of the receiving base station numbers and requested base station numbers corresponding with all the mobile stations controlled by the master station. A requested base station number is data concerning the most suitable base station to which the relevant mobile station can execute communication. The polling registration table stores polling flags determining whether or not polling should be carried out to a mobile station number and the mobile station thereof for each of the receiving base stations registered in the base station registration table. In addition, this polling registration table also stores processing specification head flags for determining at which receiving base station processing should commence. Finally, the polling specification table stores the selected base station numbers of the selected base stations which actually carry out polling based on both the polling sequence and the requested base station number in the polling registration table and their corresponding mobile station numbers.

Carrier Sense Value Registration Table

In order to implement levelling, the master station 10 stores the carrier sense value of each channel at each mobile station 14 in a carrier sense value registration table. FIG. 7 shows this carrier sense value registration table. The distribution states here have the following meanings: [1]=not distributed, [2]=distribution completed, [3]=region switch, [4]=now searching. In FIG. 7 (A), mobile stations %1, %2, %3, %6 are using the maximum level channels according to the carrier sense result. Since mobile stations %4 and %5 are positioned in designated regions, their channels are specified according to their position.

When mobile station %2 moves in the direction of base station #2, the carrier sense value of channel f2 increases as FIG. 7 (B) shows. Consequently the distribution state of mobile station %2 momentarily becomes [1] (not distributed) and returns to [2] (distribution completed) when distribution processing has ended, but the channel used by mobile station %2 remains unchanged. Moreover, in this example, when mobile station %3 moves from base station #2 to the vicinity of base station #6, the channel used by mobile station %3 switches from f2 to f6 as FIG. 7 (C) shows.

A 0 sense value represents an actual sense value of 0 and, when the table values have been cleared, values which do not yet exist are set at 999. In addition, a sense value of, for example, over 100 is a possible receiving radio wave.

Master Station Processing

The master station 10 uses the abovementioned setting tables, control table and carrier sense value registration table to control the mobile stations and polling communications via the base stations.

Figure 8:
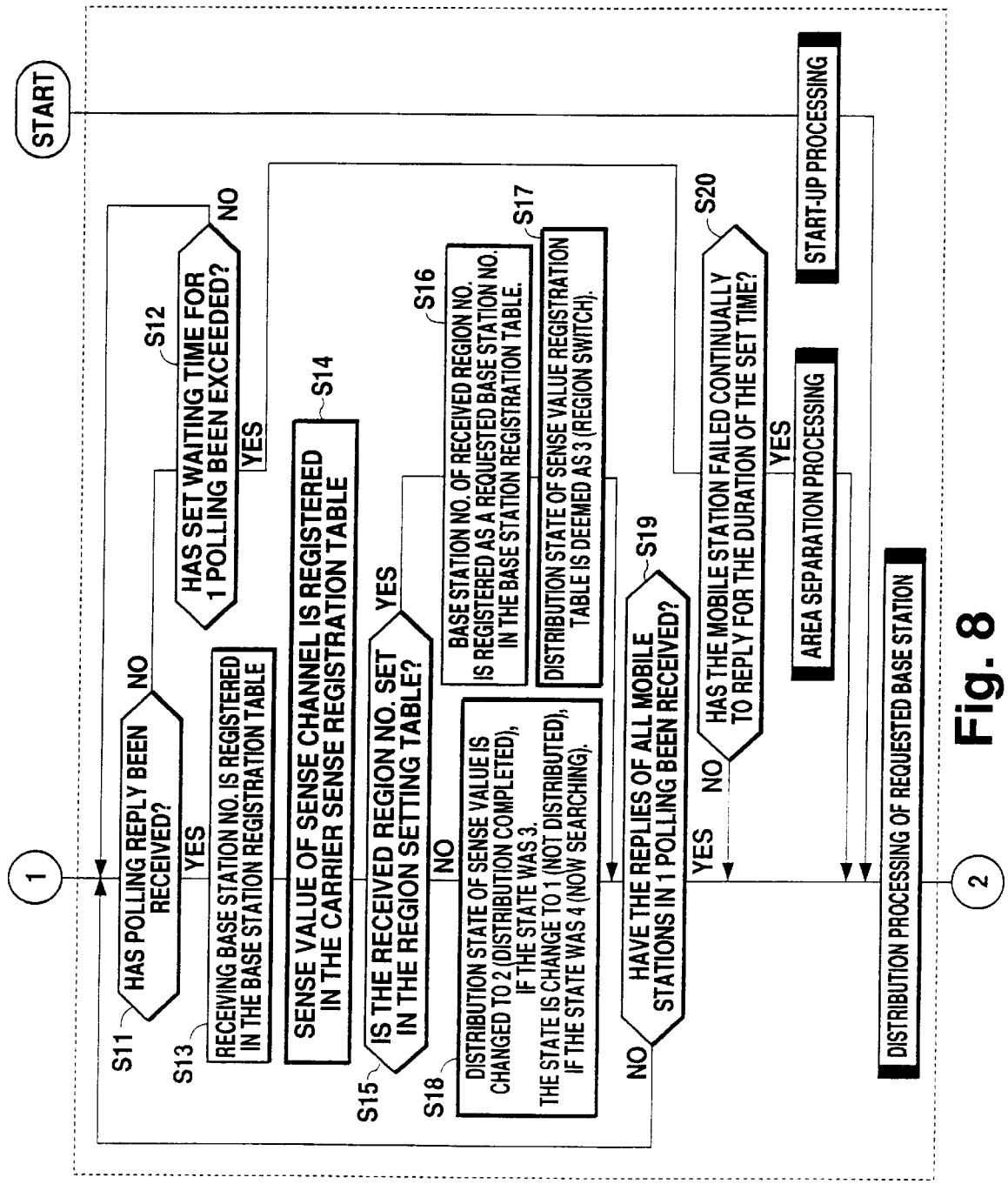
FIG. 8 is a flowchart of processing at a master station.

FIG. 8 shows an operation wherein, after completion of polling of 1 mobile station for 1 base station the base station, which has received the polling reply is determined and a requested base station to be used in the next polling is determined after judging whether the base station presently used in polling is being switched according to carrier sensing or according to the location of the mobile station.

First, after completion of polling of 1 mobile station for 1 base station the master station judges whether or not a polling reply has been received (S11). When a polling reply has not been received, it is determined whether or not the set waiting time for 1 polling set in advance has been exceeded (S12) and when this set time has not been exceeded, the operation returns to S11 and this operation is repeated. When a polling reply has been received at S11 the number of the base station which has received the reply is registered in the base station registration table. In other words, a base station which used a mobile station which received a polling reply is deemed to be a receiving base station and is registered in the base station registration table (S13). A carrier sense value based on sense channel and sense value data included in the polling receiving signal is then registered in the carrier sense value registration table (S14).

Next, it is determined whether or not the received region number is set in the region setting table (S15). This is because a region identifying system is utilized wherein, when a region number is set in the region setting table as shown in FIG. 5 (B), the mobile station informs the master station 10 of its own position by transmitting a region number to the master station and the master station determines a base station (requested base station) to have jurisdiction over this mobile station.

In S15, when a received region number is set in the region setting table, the master station 10 deems the base station number of a received region number as a requested base station number and registers it in the base station registration table (S16). This is carried out based on the region setting chart shown in FIG. 5 (B). Therefore, when a mobile station has moved from the jurisdiction of one base station to the jurisdiction of another base station, the receiving base station number and the requested base station number differ.

The distribution state in the sense value registration table is then set at 3 (switch of region) (S17). In other words, when a received region number is set in the region setting table, the base station to be used should be set depending on the region of that mobile station 14 and thus the distribution state is deemed as 3 (switch of region).

Alternatively, when a received region number has not been set in the region setting table, the distribution state of the sense value registration table is checked and, if the distribution state of the mobile station 14 was 3 (region switch), it is changed to 2 (distribution completed). In other words, this is because levelling has ended. Or, when the distribution state was 4 (now searching), this is changed to 1 (not distributed) (S18). This is because distribution processing i.e. levelling has not yet been completed for the mobile station which received the polling reply.

When distribution processing of the sense value registration table in S17 and S18 has ended, it is next determined whether or not the replies of all the mobile stations in the polling operation have been received (S19). If the result at S19 here is NO, the operation returns to S11 and repeats the same processing for another mobile station and carries out registration in the base station registration table for all the mobile stations in one polling operation. A single polling is executed based on the polling specification table shown in FIG. 6 (C). Therefore polling is carried out to one mobile station of each base station selected and the number of mobile stations to which polling is carried out in 1 polling is the same as the number of selected base stations, with the exception of those used in dummy polling (explained below).

In S12 when the set waiting time for 1 polling has been exceeded, it is determined whether there is a mobile station which has repeatedly failed to reply for the duration of the set time (S20). This is because when a mobile station has been continually unable to reply despite polling attempts it is envisaged that this mobile station has strayed from the area in which communication with it is possible. In such a case, area separation processing is carried out as explained below. At the start of the operation, start-up processing is carried out as explained below.

Distribution processing (described below) of base station (channel) to be used by a mobile station is carried out in cases where the replies of all the mobile stations in one polling operation have been received in S19, in cases where no mobile station has repeatedly failed to reply for the duration of the set polling time in S20, in cases where area separation processing has been completed and in cases where start-up processing has been completed. In addition, processing such as levelling is carried out during the distribution processing of such a requested base station.

Figure 9:
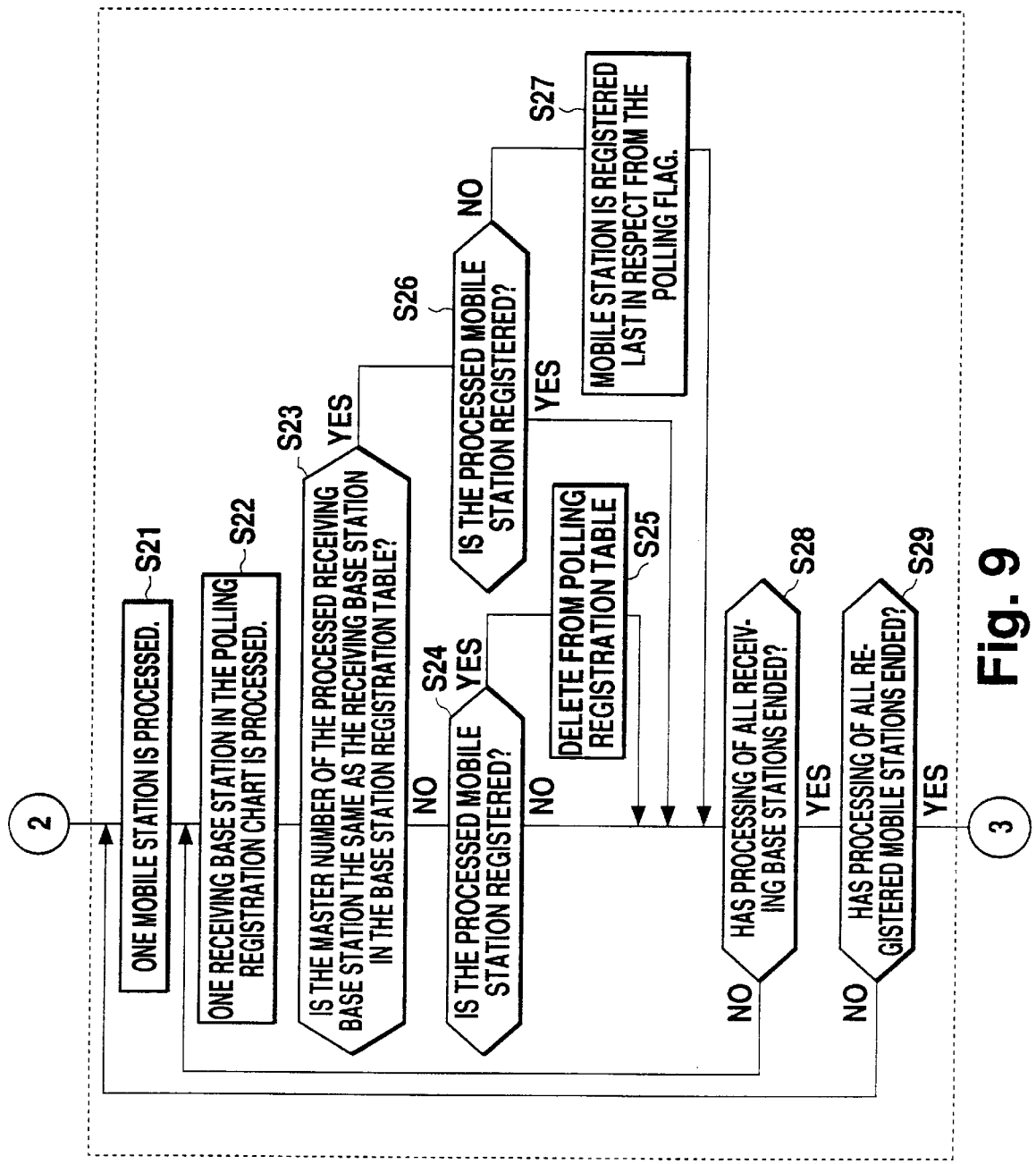
FIG. 9 is a flowchart of processing at a master station.

Thus, according to the processing shown in FIG. 8, when a requested base station number has been registered in the base station registration table, processing is carried out wherein a base station to be used in polling is renewed to the base station received, this time as shown in FIG. 9.

The processing shown in FIG. 9 is carried out to all receiving base stations and all mobile stations which are not registered. Processing is first carried out to one mobile station (S21). Next, processing is carried out to one receiving base station from the polling registration table (S22). It is then determined whether or not the receiving base station which has been processed is the same base station as the receiving base station of the base station registration table (S23).

Therefore, in a case where the result in S23 was NO, this signifies that the relevant receiving base station of the polling registration table is not the receiving base station of the processed mobile station. It is then determined whether or not the mobile station processed for this receiving base station is registered (S24). If the processing mobile station has been registered, it is deleted from the polling registration table (S25). This is because the processing base station here is not the receiving base station. Thus, in a case where the processing mobile station has moved from one base station to another base station and another base station has become the receiving base station, the base station previously being used is deleted from the polling registration table. Since the receiving base station listed in the base station registration table is renewed in S13 as described above, when the switching of the base stations has ended the base station actually used by the mobile station is registered in the base station registration table as a receiving base station.

When the result in S23 was YES, it is determined whether or not the processed mobile station has been registered (S26). If the results of S23 and S26 are both YES, no special processing is carried out because polling registration of the present receiving base station has been completed. However if the result at S26 is NO, that mobile station must be registered as a mobile station of the processed receiving base station. This mobile station is here registered in the polling registration table, at which time the mobile station is registered in the final position from the polling flag in order (S27). This is so as not to disturb the polling order with this base station. If the mobile station were to be registered close to the polling flag then the next polling would again be carried out at that mobile station, thereby disturbing the polling order.

In a case where processing in S25 and S27 has ended and the result in S26 was YES, it is next determined whether or not processing of all the receiving base stations has ended (S28) and, if the result is NO, the operation returns to S22 and processing is repeated until processing is completed for all the receiving base stations of the mobile stations being processed. Moreover, if the result in S28 is YES, it is determined whether processing of all registered mobile stations has ended (S29) and, if it has not ended, the operation returns to S21. Judging is carried out in this way to all the receiving base stations of one mobile station and similarly for all the mobile stations. Thus organization and renewal of polling registration tables for all mobile stations is executed.

Thus when the processing shown in FIG. 9 has ended, processing is executed to all those [mobile stations] for which the receiving base station and requested base station are different. An explanation of this processing will be given based on FIG. 10. First, a single base station starting from the receiving base station at which the processing specification head flag is raised is deemed as the processing base station (S31). Then the mobile station with raised polling flag is deemed as the processing mobile station (S32). Next, the receiving base station numbers and requested base station numbers of these processing mobile stations are extracted from the base station registration table (S33).

In a case in which a plurality of base stations have been allocated to the same channel, there may be a plurality of requested base station numbers. If one of these requested base station numbers is the same as the receiving base station number, only the receiving base station number is extracted. In other words, the base station which has actually received a reply is selected.

It is then determined whether or not the mobile station is unregistered for all the extracted base station numbers in the polling registration table (S34). In other words, if one mobile station has been unable to carry out polling to all its requested base stations, polling is not carried out this time. In a case where the result at S34 was YES, the mobile station is registered in all the extracted base station number (S35). Thus a single mobile station is registered in all the polling plans of the base stations requested by the mobile station. Therefore, in a case in which the receiving base station number and requested base station number for a single mobile station are different, that mobile station is registered in the polling registration table for both the previous receiving base station and the present requested base station.

Next the polling flag of the polling registration table is proceeded to the next base station (S36), thereby setting the next base station to which polling is to be executed. When S36 has ended and a case in which the result in S34 was NO, it is determined whether or not processing for all base stations has ended (S37). If the result at S37 is NO the operation returns to S31 and the same processing is repeated. In this way registration of mobile stations for base stations of requested base station numbers can be carried out in response to the raised polling flags of the mobile stations. When the result at S37 is YES, the processing specification head flag is proceeded to the next base station. This is because when a communications error has continued for a number of times during the polling of one mobile station at a plurality of base stations, the first receiving base station to be processed is altered each time and the detection processing order of this mobile station is altered each time in order that the polling period for other mobile stations is not lengthened.

Figure 10:
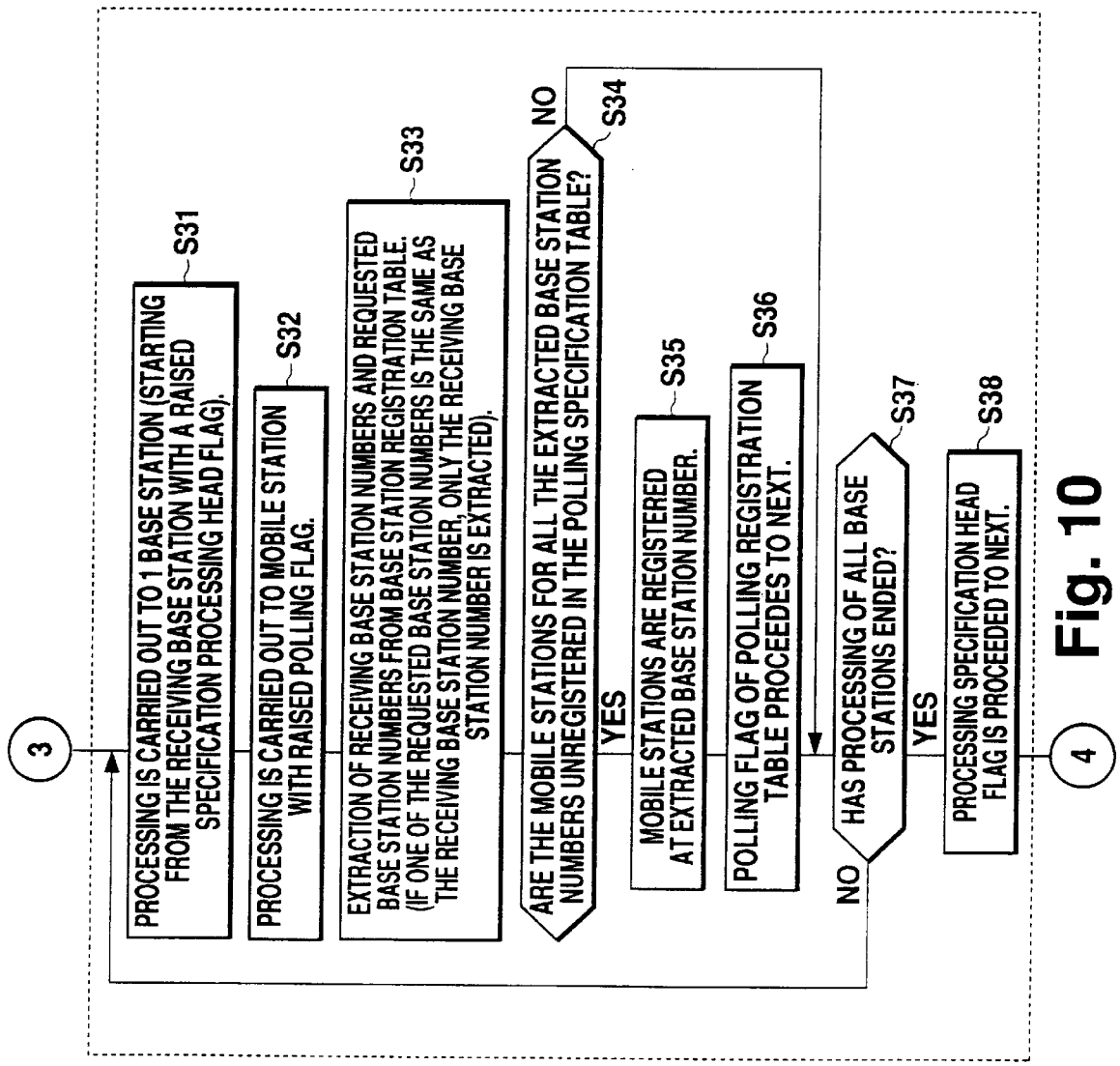
FIG. 10 is a flowchart of processing at a master station.
Figure 11:
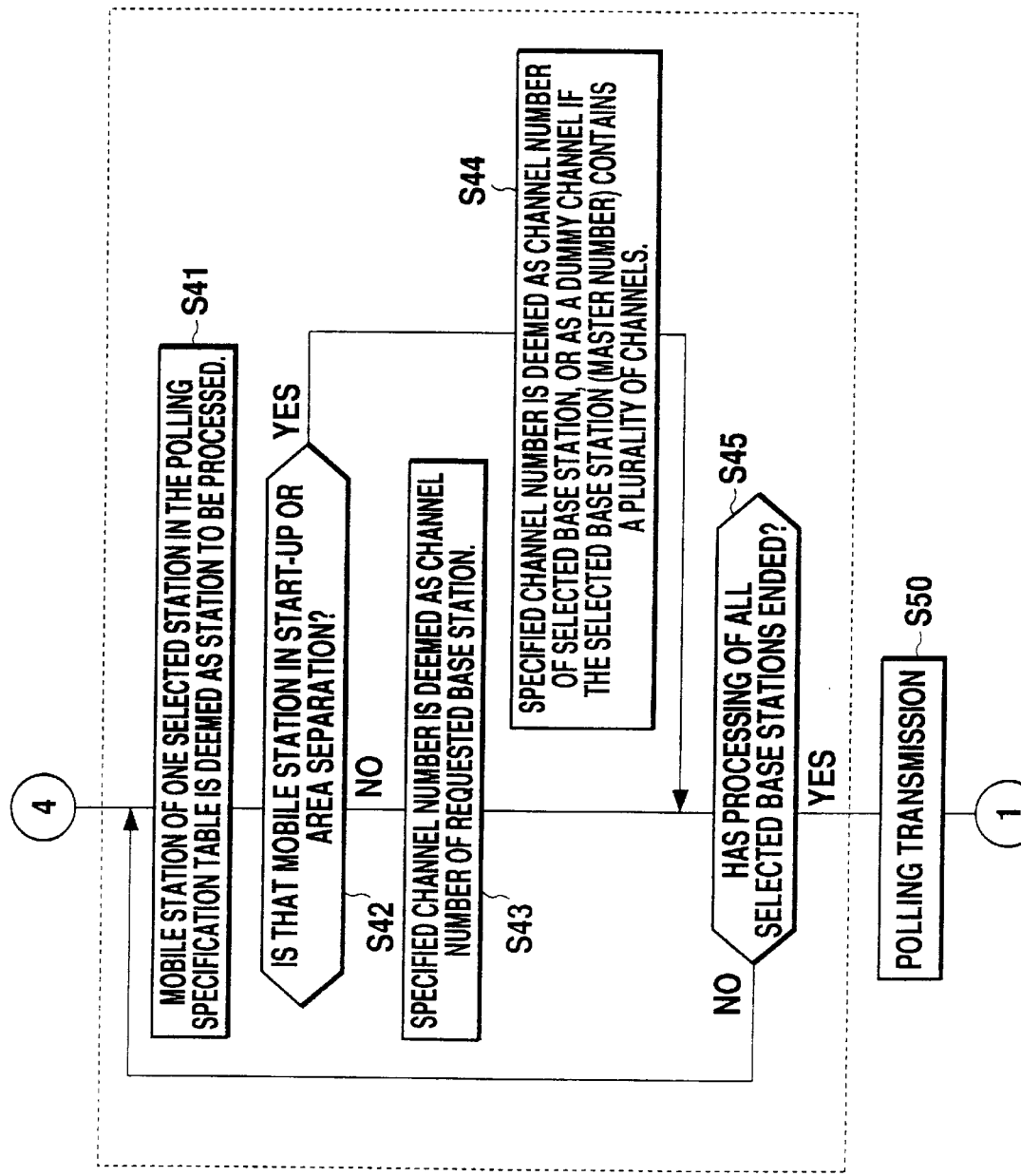
FIG. 11 is a flowchart of processing at a master station.

When the processing shown in FIG. 10 has ended, setting is carried out of the specified channel number used when polling transmission is executed. This will be explained based on FIG. 11. First, a mobile station of one of the selected base stations in the polling specification table is deemed as the mobile station to be processed (S41). Then it is determined if that mobile station is presently in start-up or in area separation (S42). If the result in S42 is NO, the specified channel number is deemed as a channel number of the requested base station (S43). Alternatively, if it is determined that the mobile station is presently in start-up or in area separation the specified channel number is deemed as a channel number of the selected base station (S44). This channel number setting is carried out based on the channel setting table. It is then determined whether or not processing has ended for all selected base stations (S45) and if the result here is NO the operation returns to S41 and processing is repeated.

In this way the channel number specified for the mobile station serves as the present channel number irrespective of the base station to be used. Moreover, when the mobile station is in start-up or in area separation, the specifying channel number serves as the channel number of the base station to be used in the polling in consideration of a case in which the mobile station itself has not determined that it is in area separation.

Since preparation for polling has been completed as a result of this processing, polling transmission is now carried out (S50). Thus polling transmission is carried out to mobile stations with raised polling flags and then the operation returns to S11 shown in FIG. 8.

Dummy polling is transmitted from base stations wherein there are no polling mobile stations. With a frame configuration such as those shown in FIGS. 4 (A)~(D) this dummy polling frame consists of a specified channel number and a mobile station number and dummy data, the data length here being fixed at a length sufficient for the mobile station to execute carrier sensing or at the maximum length of all base stations for this single polling transmission.

Distribution Processing of Requested Base Station

Figure 12:
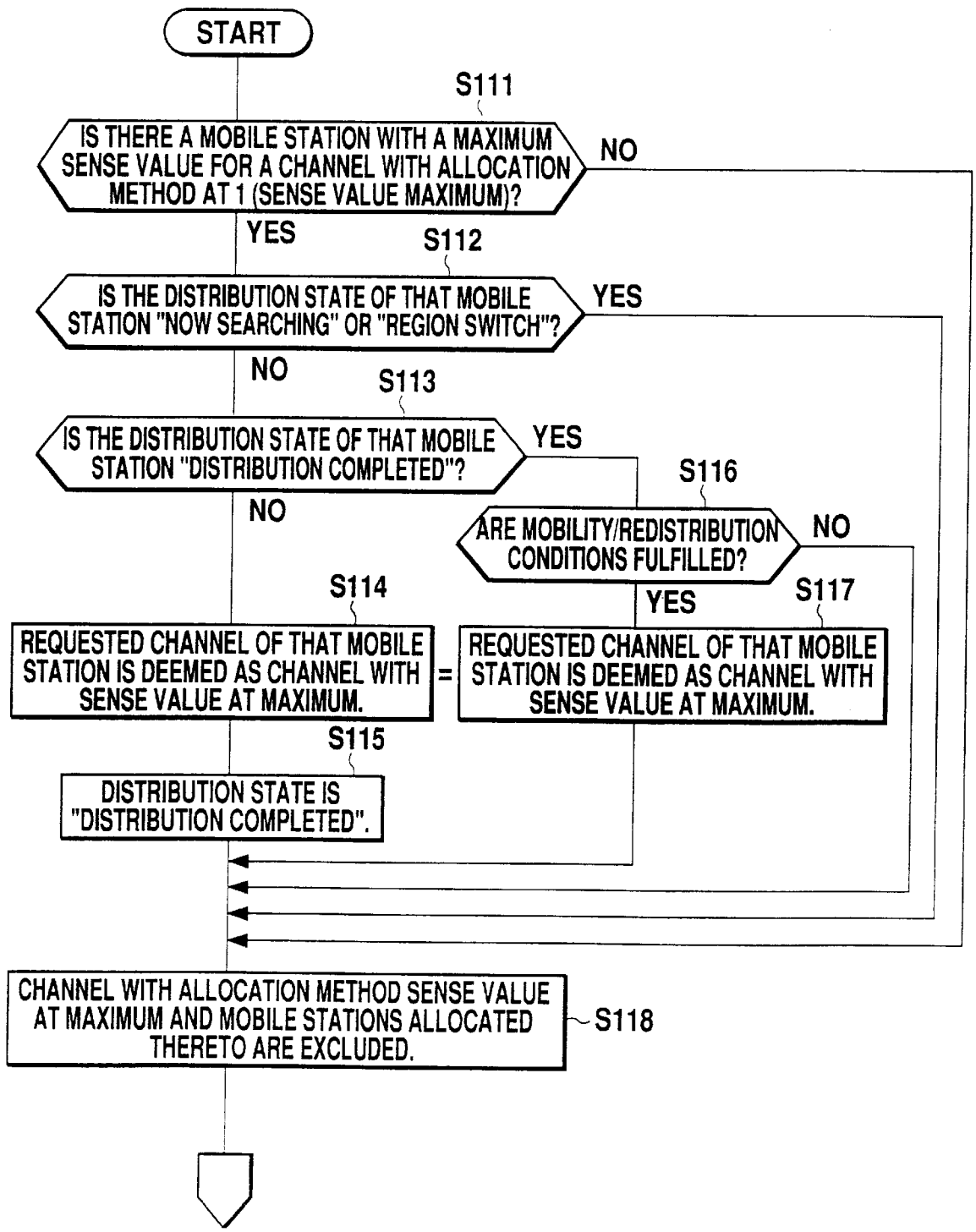
FIG. 12 is a flowchart of distribution processing of a requested base station.
Figure 13:
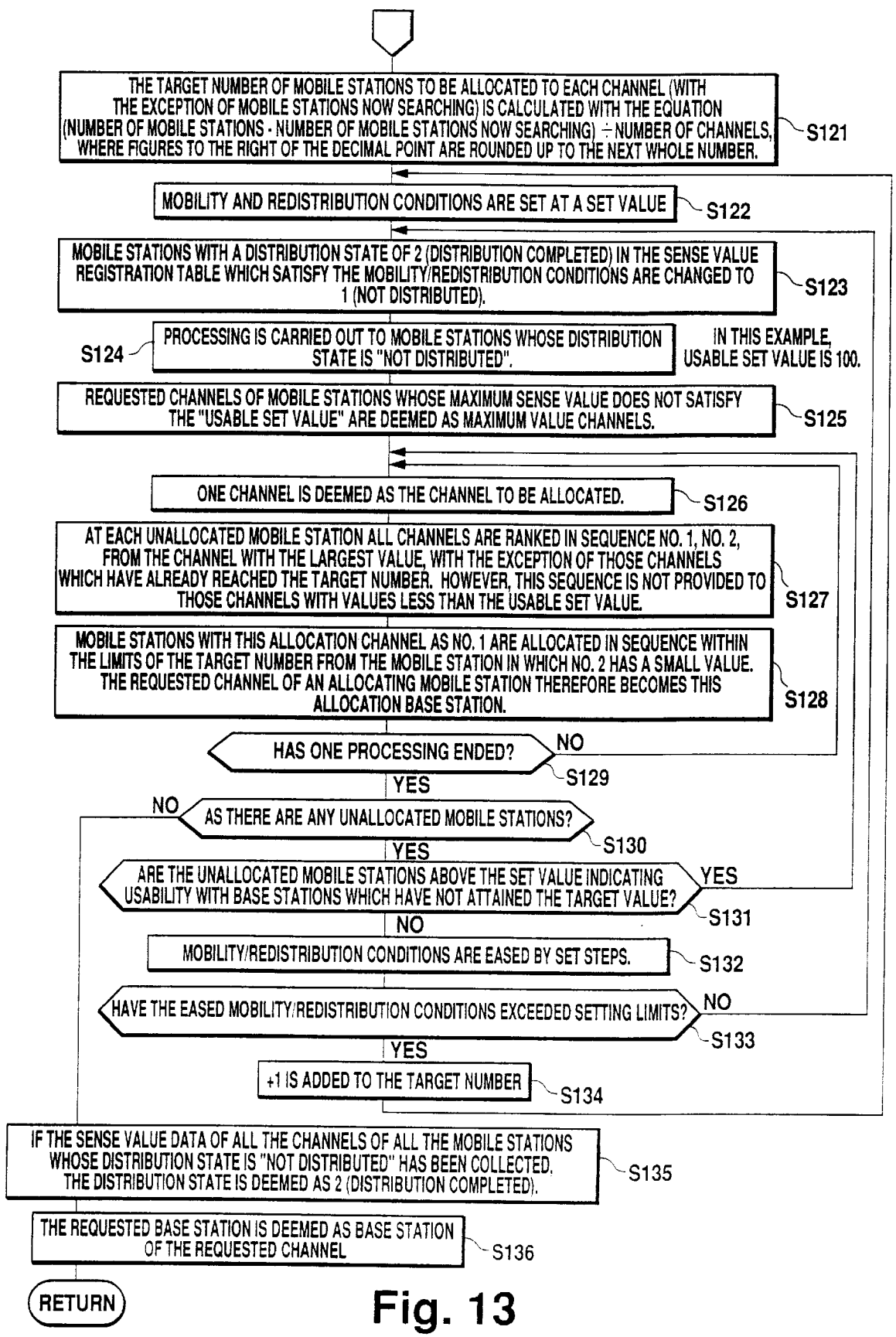
FIG. 13 is a flowchart of distribution processing of a requested base station.

The distribution processing of a requested base station shown above in the final section of FIG. 8 will next be explained with reference to FIG. 12 and FIG. 13.

In this processing it is first determined whether there is a mobile station with a maximum sense value for channel indicated by a value of 1 (Sense Value Maximum) in the allocation method section of the channel setting table shown in FIG. 5 (A) (S111). If the result here is YES, it is determined whether the distribution state of the mobile station with value 1 is at "Now Searching" or at "Region Switch" (S112). If the result in S112 is NO, it is determined whether the distribution state of that mobile station is at "Distribution Completed" (S113). If it is determined that distribution is not completed (i.e., the result here is NO), the requested channel is deemed as the channel with sense value at maximum (S114) and the distribution state is set to 2 (Distribution Completed) (S115) as the channel with sense value at maximum may be used as the channel for that mobile station. Alternatively, if the result in S113 is YES, in other words if distribution has been completed, it is determined whether mobility/redistribution conditions have been satisfied (S116) and, if the result here is YES, the requested channel of that mobile station is deemed to be the channel with sense value at maximum (S117).

After processing has ended of a channel with allocation method sense value at maximum, this channel and the mobile stations allocated thereto are excluded (S118).

The following processing is then carried out to the other channels and mobile stations. First, the target number of mobile stations to be allocated to each channel (with the exception of mobile stations now searching) is calculated with the following equation (S121):

target number=(number of mobile stations−number of mobile stations now searching)÷number of channels, where all figures to the right of the decimal point are rounded up to a whole number.

As is evident from the above equation, the target number is a number wherein an equal number of mobile stations is allocated to each channel.

Figure 14:
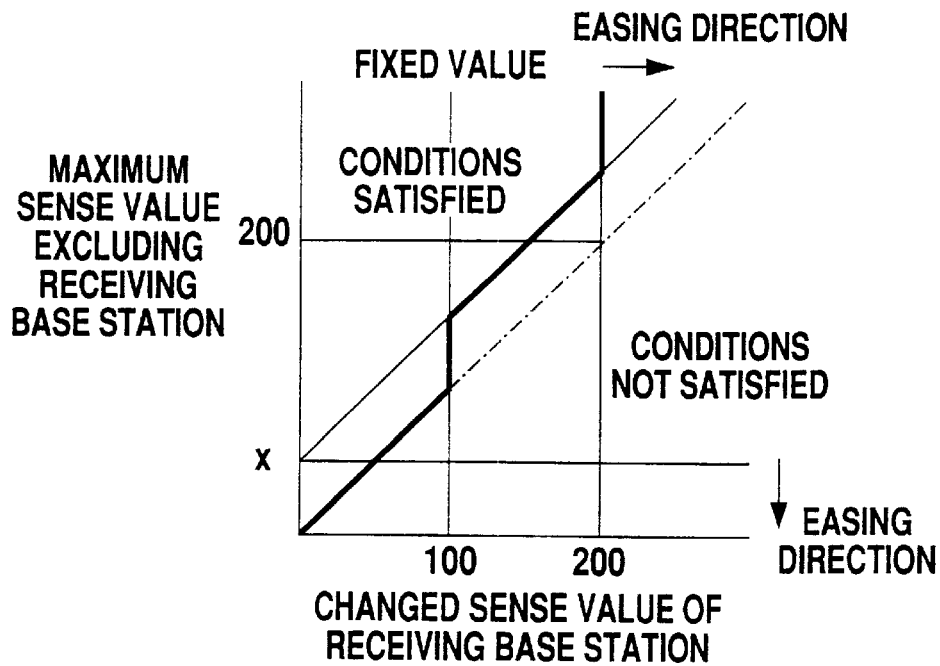
FIG. 14 is a diagram depicting an explanation of mobility/redistribution conditions and an example of value setting thereof.

Next, the mobility and redistribution conditions are set at a set value (S122). This mobility/redistribution conditions set value is set in the manner shown in FIG. 14. Namely, with the channel sense values of the receiving base station along the horizontal axis and the maximum sense values excluding the receiving base station along the vertical axis, when a base station having a sense value greater than the receiving base station exists during the period in which the receiving base station sense value is 0~100, conditions are deemed as Satisfied; when there has been a base station having a sense value greater than the sense value of the receiving base station only by a designated value x (e.g., 10) during the period in which the receiving base station sense value is 100~200, the conditions are deemed as Satisfied; when the sense value of the receiving base station exceeds 200 all conditions are deemed as Not Satisfied. Then, for instance by reducing or increasing the abovementioned x value, the conditions can be eased and the ratio of those satisfying the conditions can be increased.

When this mobility/redistribution conditions setting processing has ended, those mobile stations with a distribution state of 2 (Distribution Completed) in the sense value registration table which satisfy the mobility/redistribution conditions are changed to 1 (Not Distributed) (S123).

Processing is next carried out to mobile stations whose distribution state is "Not Distributed" (S124). A requested channel of a mobile station whose maximum sense value does not satisfy a "Usable Set Value" is deemed as a maximum value channel (S125). This usable set value can be 100, for instance.

One channel is then deemed as the allocation channel (S126) and at each unallocated mobile station all channels are ranked in sequence No. 1, No. 2, . . . from the channel with the largest value, with the exception of those channels which have already reached the target number (S127). However, this sequence is not provided to those channels with values less than the usable set value.

Next, the mobile stations with this allocation channel as No. 1 are allocated in sequence within the limits of the target number from the mobile station in which No. 2 has a smaller value (S128). In other words, the requested channel of an allocating mobile station becomes the allocation channel. As a consequence, allocation is carried out with priority given to those mobile stations in which the second channel has a small sense value.

When the processing in S128 has ended, it is determined for all channels whether a single processing has ended (S129) and, if the result here is NO, the operation returns to S126 and repeats the processing.

If the result in S129 is YES, since allocating has been completed for all channels it is next determined whether there are any unallocated mobile stations (S130). If the result in S130 is YES it is determined whether the unallocated mobile stations are above the set value indicating usability with base stations which have not attained the target value (S131). If the result in S131 is YES, since those mobile stations can be allocated the operation returns to S126 and the mobile stations are allocated by repeating the allocating processing.

However, when the result in S131 is NO, the mobility/redistribution conditions are eased by set steps. In other words, the conditions satisfied in FIG. 14 as described above are eased (S132). It is then determined whether the mobility/redistribution conditions thus eased have exceeded setting limits (S133) and, if the result here is NO, the operation returns to S123 with the conditions in the eased state and redistribution processing is executed.

However, if the result at S133 is YES, since the conditions therefore cannot be eased, +1 is added to the target number (S134). In other words, the target number for each channel is increased, as is the number of mobile stations which can be allocated to channels used by each base station. The operation then returns to S122 and the processing described above is repeated after returning the mobility/redistribution conditions to the set value.

This processing is repeated until there are no unallocated mobile stations. Then, when there are no unallocated mobile stations and the result in S130 is therefore NO, and if the sense value data of all the channels of all the mobile stations whose distribution state is "Not Distributed" has been collected, the distribution state is deemed as 2 (Distribution Completed) (S135) and the requested base station is deemed as base station of the requested channel (S136).

Thus mobility/redistribution is carried out to those mobile stations which satisfy the mobility/redistribution conditions and distribution processing is carried out to the requested base station, thereby levelling the number of mobile stations allocated to each channel. Replacement of a channel used by the mobile station can be carried out based on the processing result and the number of mobile stations allocated to each channel can be levelled. Thus the time taken for executing communication to all the mobile stations can be shortened.

Figure 15:
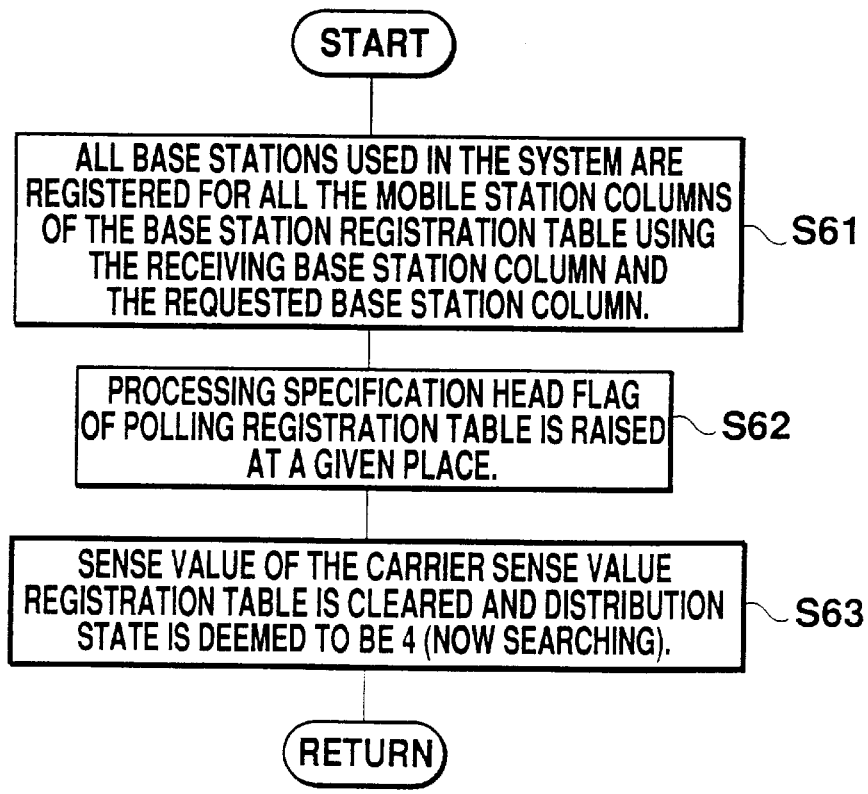
FIG. 15 is a start-up processing flowchart.
Figures 16, 17:
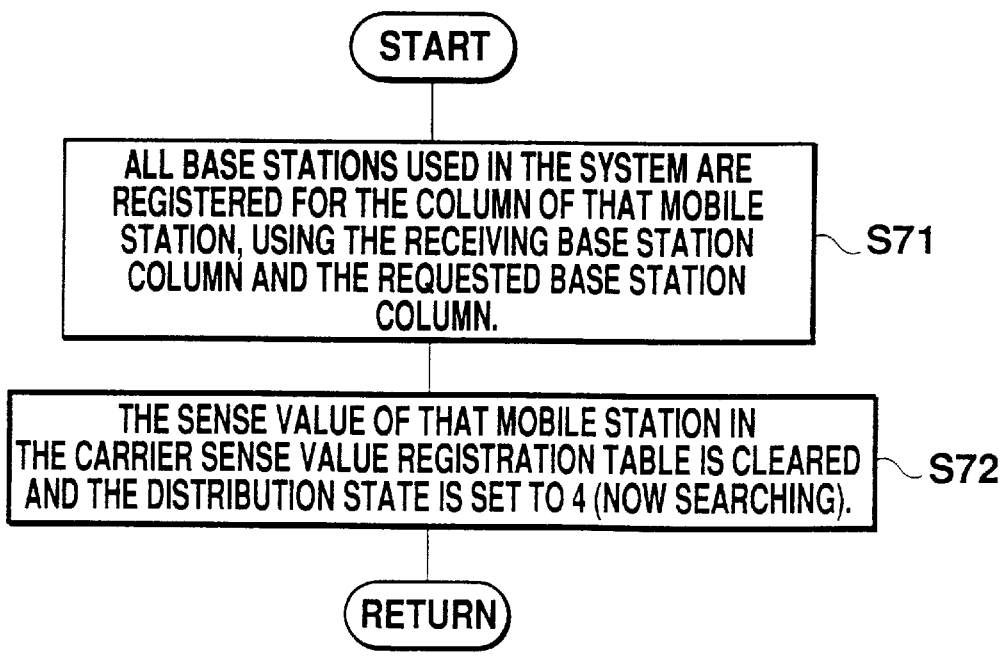
FIG. 16 is an explanatory diagram showing base station registration table at the time of start-up processing.
FIG. 17 is an area separation processing flowchart.

In particular, in this example, allocation of levelling is carried out in the following order of priority:

(i) the numbers of mobile stations are levelled under conditions when the sense value exceeds its set value (ii) replacement of the base station being used is avoided where possible (iii) the minimum value of the sense value used is as high as possible (iv) all mobile stations use base stations with high sense values wherever possible Start-up Processing FIG. 15 shows a start-up time processing flowchart. At start-up time, all base stations used in the system are registered for all the mobile station columns of the base station registration table using the receiving base station column and the requested base station column (S61). The processing specification flag of the polling registration table is then raised at a given point (S62), since this processing specification flag can be raised at any point, it may be set in advance. As a result of this processing, all the base stations for a single mobile station are registered as FIG. 16 shows.

Thus, if base station #1 is registered as the receiving base station number and #2, #3, #4, #5 are respectively registered as the requested base station numbers for all the mobile stations, polling is carried out to mobile station %1 from all the selected base stations in the first polling. If the mobile station returns a reply to any one of the base stations, that base station number is registered as the receiving base station number. In addition, if the requested base station number at that moment is identical, that base station number is also registered as the requested base station number. In this way, registration of the receiving base stations can be carried out for all mobile stations at the system start-up.

In addition, the sense value of the carrier sense value registration table is cleared (i.e., it is set to 999) and the distribution state is deemed to be 4 (Now Searching) (S63). Consequently, when polling reception has been executed, the distribution state is changed to 1 (Not Distributed) at S18 in FIG. 8 and channel allocation processing is carried out in the same way as for the other mobile stations.

Area Separation Processing

Area separation processing will next be explained based on FIG. 17. When there is a mobile station which has repeatedly failed to reply for the duration of the set time as in S20 described above, all the base stations used in the system are registered for the column of that mobile station in the base station registration table using the receiving base station column and the requested base station column (S71). Then the sense value of that mobile station in the carrier sense value registration table is cleared and the distribution state is deemed to be 4 (Now Searching) (S72).

Thus all the base stations for that mobile station become either receiving base stations or requested base stations. Therefore, that mobile station is thus registered in the polling registration table for all the base stations and polling for that mobile station can be carried out from all the base stations. Therefore, in a case in which that mobile station has re-entered the area, it can receive a polling reply from any of the base stations, the distribution state becomes 1 (Not Distributed) and channels are similarly allocated.

Mobile Station Processing

Figure 18:
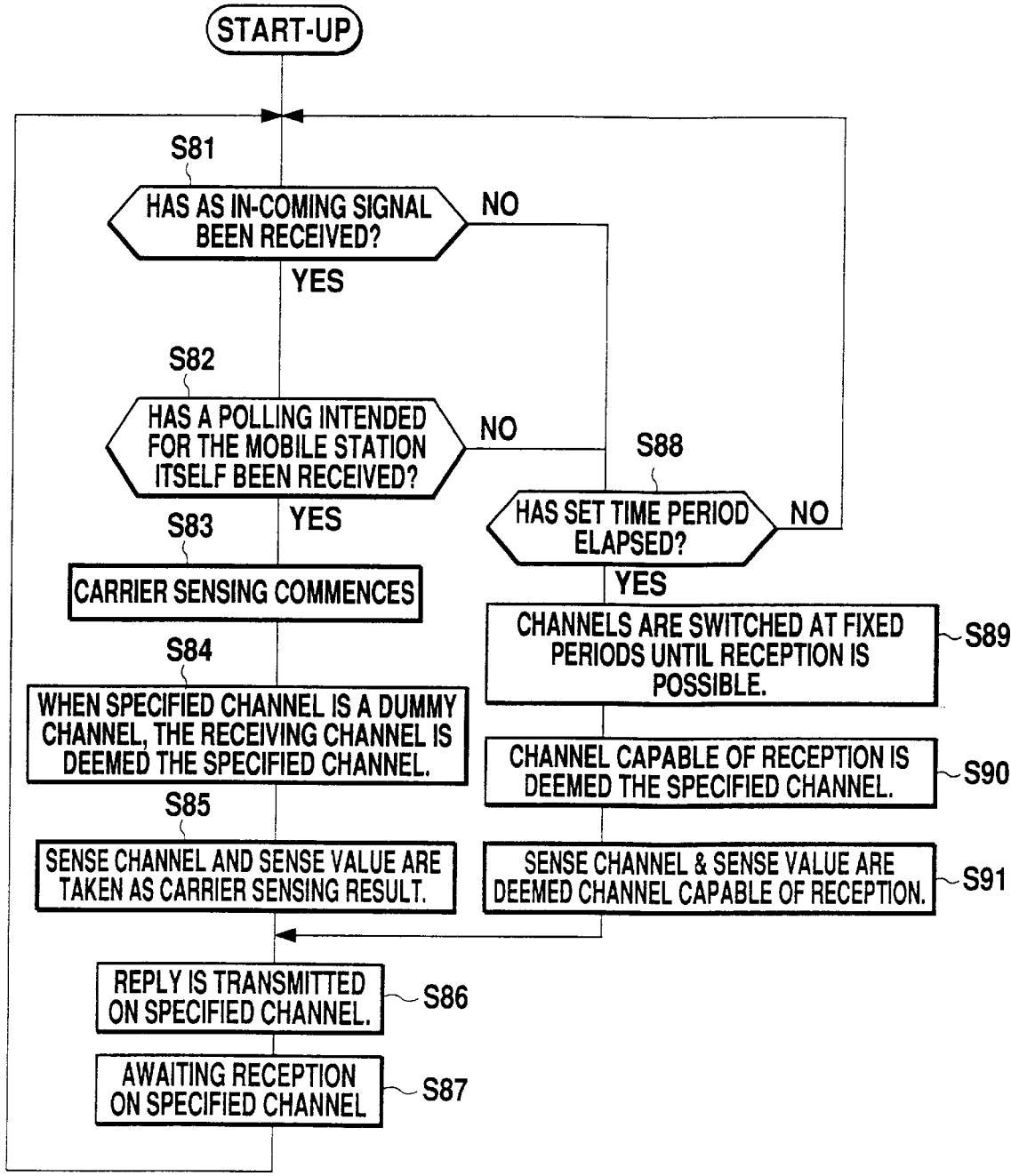
FIG. 18 is a mobile station control flowchart.

The mobile station control flowchart will next be explained with reference to FIG. 18. At the mobile station it is first determined whether an incoming signal has been received (S81). When an incoming signal has been received, it is then determined whether a polling transmission intended for the mobile station itself has been received (S82). In a case in which polling intended for the station itself has been received, carrier sensing commences (S83).

In addition, when the specified channel is a dummy channel, the received channel is deemed as the specified channel (S84) and the sense channel and sense value are taken as the carrier sensing result (S85). Carrier sensing is carried out in sequence for all channels.

A polling reply is then transmitted on the specified channel (S86), the station is set to "awaiting reception" on the specified channel (S87) and then this operation returns to S81.

However, when the result at S81 or S82 is NO, it is determined whether the set time has elapsed (S88). In a case in which the set time has not elapsed, the operation returns to S81 and awaits reception.

When the set time has elapsed in S88, the channels are switched at fixed periods until reception becomes possible (S89). The channel on which reception becomes possible is deemed the specified channel (S90) and the sense channel and sense value are deemed as this channel (S91). Consequently, even in a case in which a mobile station has separated from its area, communications can recommence when it has returned to an area of one of the base stations and a sense channel and sense value can be returned.

Communication Timing

Figure 19:
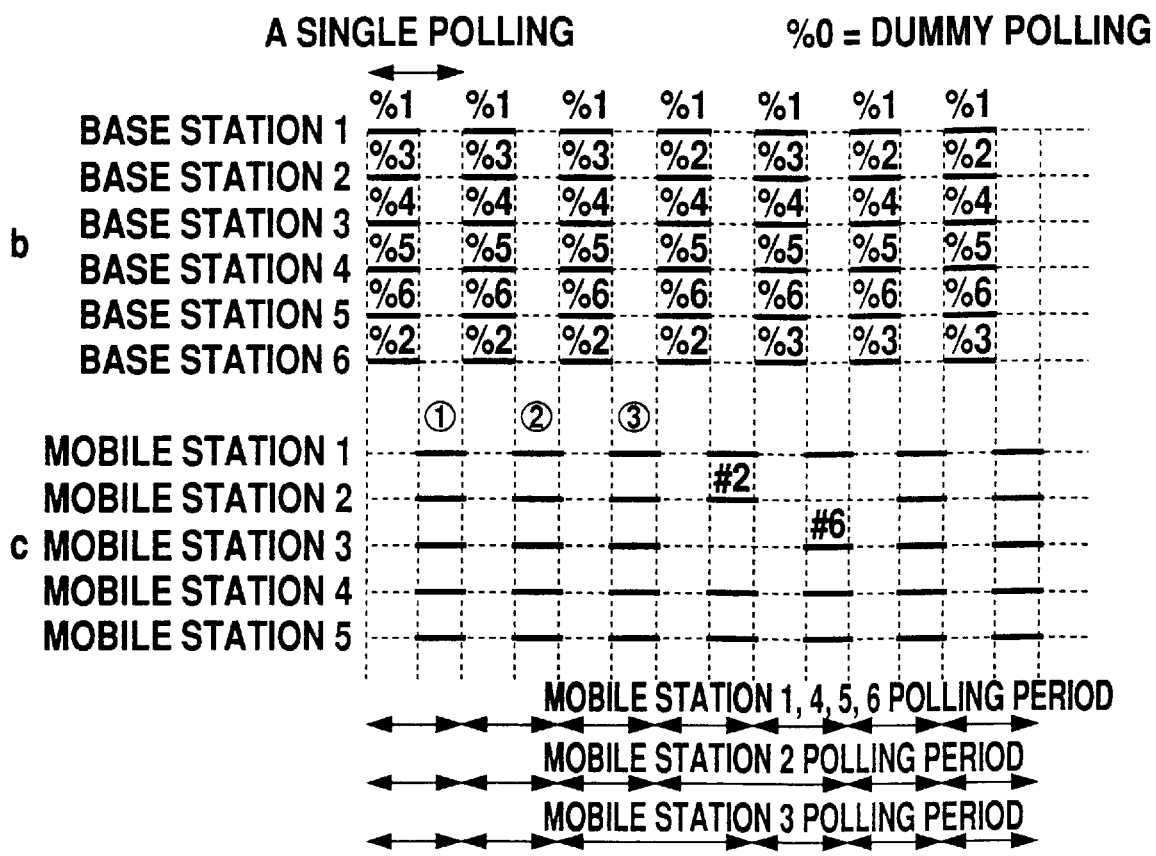
FIG. 19 is a timing table to explain the operation of a first embodiment.

Next, FIG. 19 depicts a control timing chart in the present embodiment. In this example as shown in the polling registration table, a single polling is carried out in the following state: mobile station %1 for receiving base station #1, mobile station %3 for receiving base station #2, mobile station %4 for receiving base station #3, mobile station %5 for receiving base station #4, mobile station %6 for receiving base station #5, mobile station %2 for receiving base station #6. Consequently, polling is carried out as shown in the polling specification table in FIG. 6 (C). Polling replies are then received from all the mobile stations.

In the third polling reply shown in the diagram, in a case in which mobile station %2 has entered the area of base station #2 and mobile station %3 has entered the area of base station #6, the requested base stations are replaced in accordance with the carrier sense result. Consequently, the fourth polling flag is repositioned at the master station and base station #2 and base station #6 both execute polling to mobile station %2 in the fourth polling. Then, base station #2 and base station #6 both execute polling to mobile station %3 in the fifth polling. Since mobile stations %2 and %3 send back replies to base stations #2 and #6, the base station with jurisdiction over mobile stations %2 and %3 is then replaced.

Figure 20:
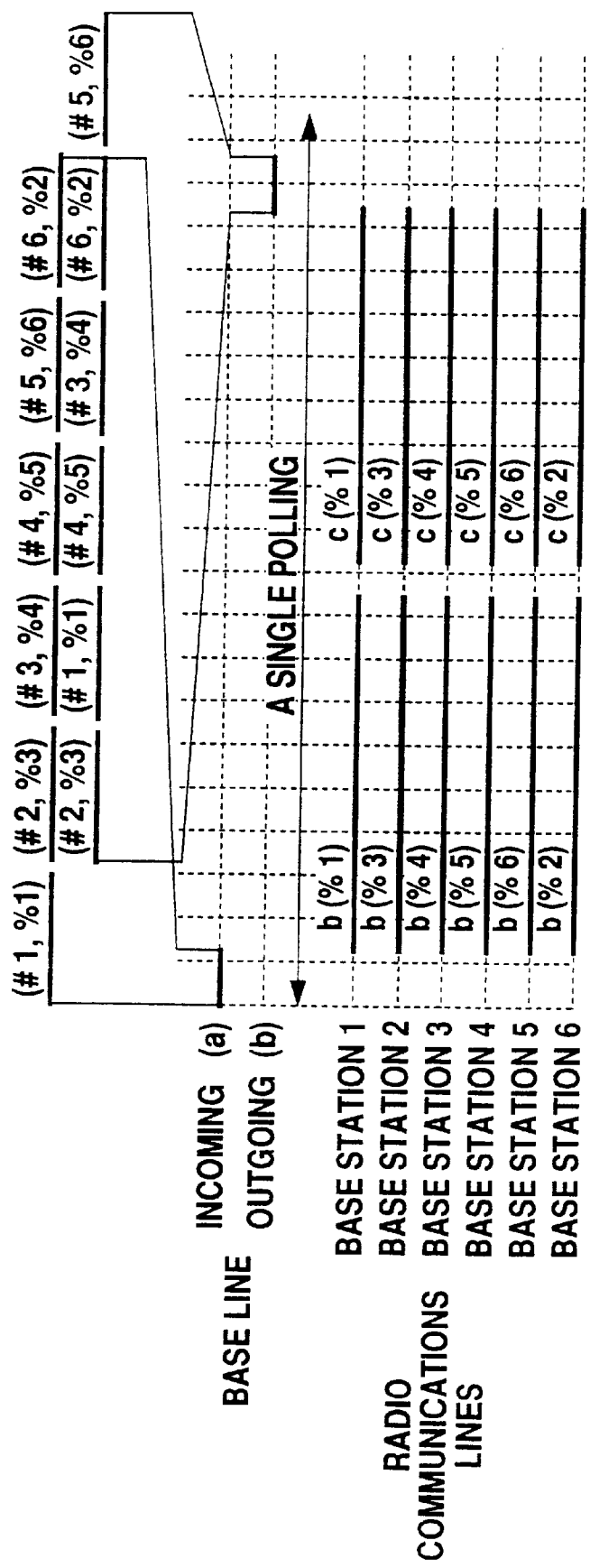
FIG. 20 is a base line timing table.

FIG. 20 is a base line timing chart in which signals to each base station are serially transmitted on the incoming signal a, each base station carries out communications separately to the mobile stations using its respective base line, each base station serially returns a polling reply as signal b to the master station.

Figure 21:
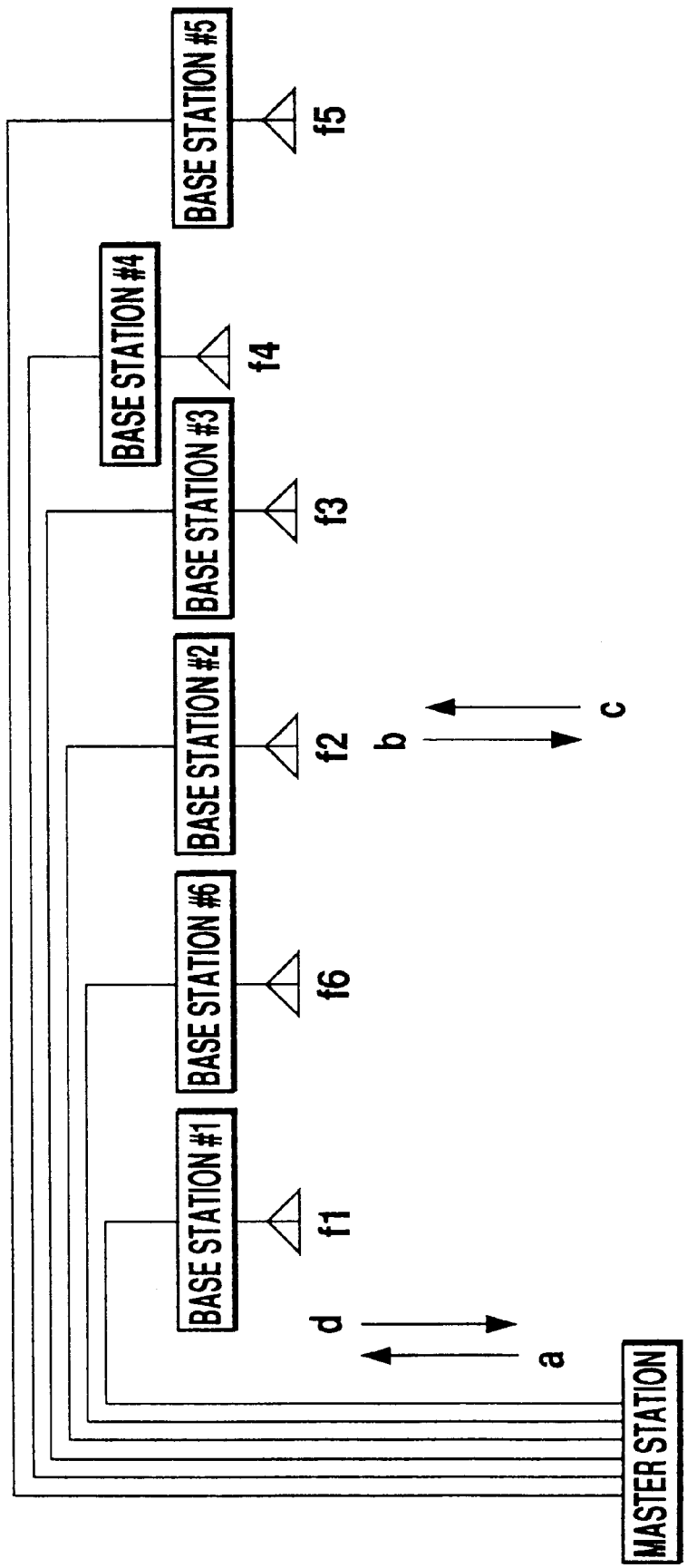
FIG. 21 is a diagram depicting the configuration of a star combination base line.
Figure 22:
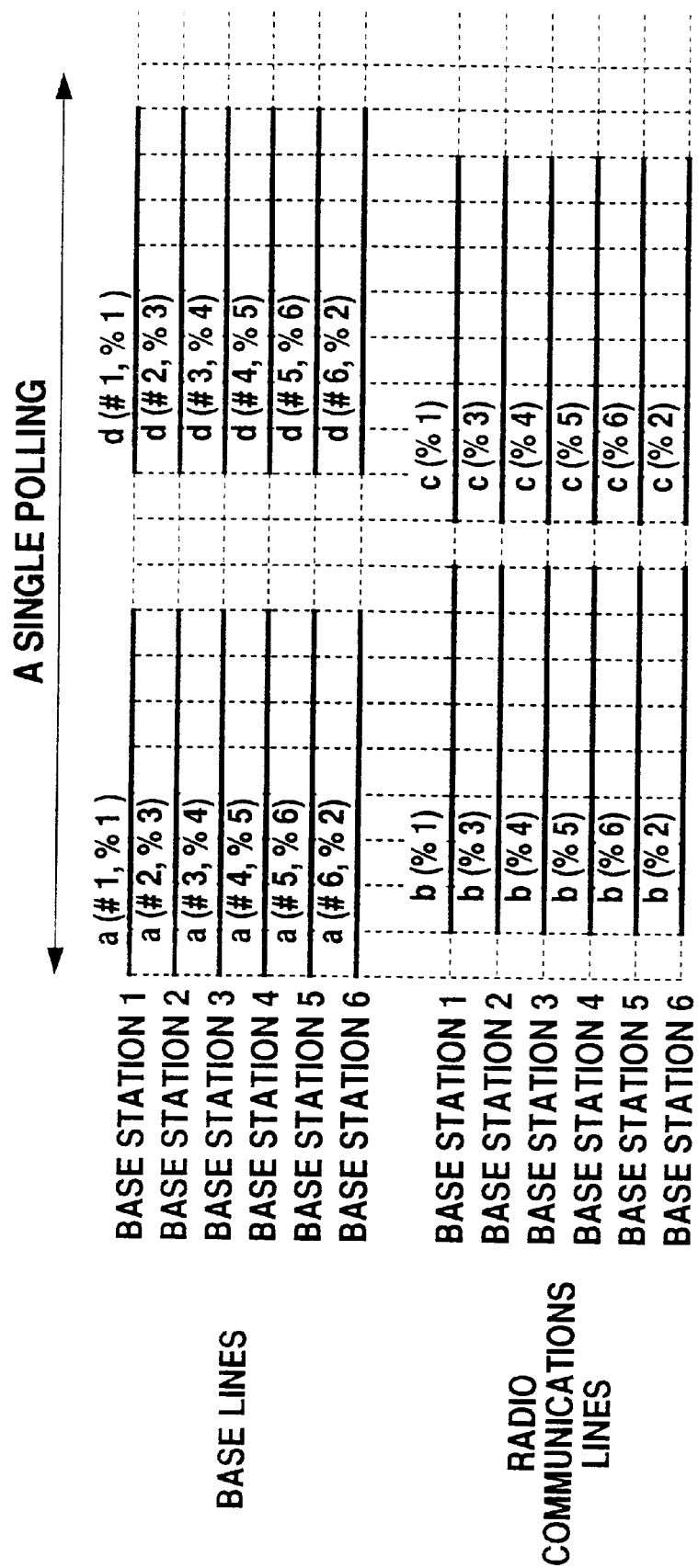
FIG. 22 is a timing table of a star combination base line.

In additions FIGS. 21 and 22 show a star combination base circuit wherein the master station 10 and all the base stations 12 are connected by their respective individual base lines in an arrangement as depicted in FIG. 21. In this case, communication between the master station and the base stations 12 is carried out in parallel as depicted in FIG. 22.

Thus, according to the present embodiment, a mobile station transmits a carrier sense result to the master station and the master station considers the carrier sense result and the number of mobile stations allocated to each channel and thereby determines jurisdiction of the mobile station.

Therefore the receiving state of the mobile station is always clearly apparent, a favorable communications state can be maintained, and, since the number of mobile stations allocated to each channel is levelled, the time taken to complete one polling operation for all the mobile stations can be reduced.

A mobile station also transmits a region number and the master station determines which base station should have jurisdiction over that mobile station based on this region number; consequently efficient allocation of the mobile station can be carried out.

Moreover, after it is confirmed that a mobile station has connected to the next base station to be used, the registration for the previous receiving base station of the mobile station is deleted from the polling registration table. Therefore communications reliability can be improved.

Other

In the example described above, incoming and outgoing frequencies were the same but a fixed frequency off-setting system is also acceptable.

Instead of a frequency, a channel identifier may, for example, make identification according to the spread signal of a spread spectrum transmission.

When carrier sensing is executed at a mobile station, if the receiving data of the carrier sense frequency is translated and the incoming data is identified, each base station can carry out polling to its own independent timing. In such a case, broadcast polling need only be executed when polling is executed by a plurality of base stations to a single mobile station during base station switching. Exempting polling failures during switching, polling during switching can also be executed independently by switching mobile station channels after transmission.

In the example described above, levelling is carried out to a registered base station of a region switch and to mobile stations using that region. Allocation which excludes mobile stations of a region switch can be realized as follows:

(i) when a mobile station has left a region, distribution state is altered from 3 (Region Switch) to 1 (Not Distributed).

(ii) "(number of) base stations" and "(number of) mobile stations" used in distribution processing exclude those of the region switch.

Carrier sensing by a mobile station may be carried out upon reception of each incoming signal and then a plurality of sense values may be sent together when the mobile station sends its reply. Since the time taken for a mobile station to execute carrier sense replies to the base stations is consequently reduced, the crossover of the communications area can be made smaller (when communications areas have not been overlapped for vigorous levelling).

In addition, carrier sensing may be carried out at each reception of an incoming signal until useful data is obtained, for instance a sense value for possible communication, and a single sense value can be sent in one reply. In this case, using the sequence of the sense frequencies the master station identifies whether or not carrier sensing has been effected for frequencies whose sense value has not been sent.

When the same channel is used with a plurality of base station numbers at distances sufficient to avoid interference, since in the example described above the mobile stations are levelled for the channel levelling is also allocated to this plurality of base stations. In order to avoid this, the "sense channel number" may be deemed a "sense base station number." This requires a sense base station number acquiring means for the mobile station carrier sensing but, since there are cases in which a base station number cannot be acquired due to weak radio waves, whether or not the data of all the base stations has been collected must depend on the number of polling replies, etc. Moreover, the allocation method (namely whether the sense value is maximum or levelled) is registered against the base station number.

When a plurality of base stations are established in the same communications area and this group of base stations is registered beforehand and the registered base station of a region switch is registered in this group, levelling can be allocated to a base station to be used with base stations within this group.

EMBODIMENT 2

In the explanation of the second embodiment, items identical to those in the first embodiment will be omitted.

System Configuration

Figure 23:
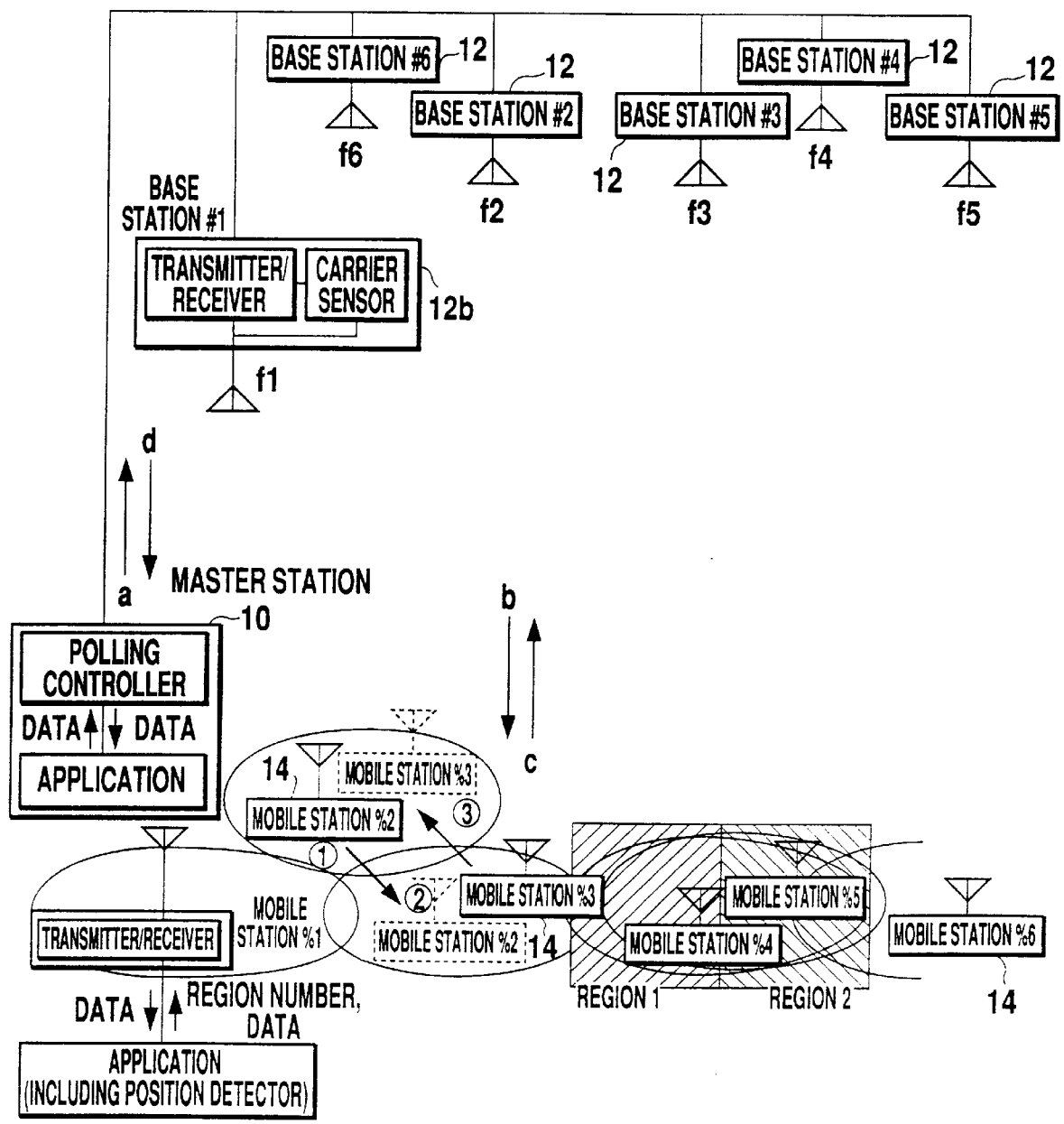
FIG. 23 is a block diagram depicting the configuration of a second embodiment.

FIG. 23 shows a system configuration of a second embodiment. In this embodiment a carrier sensor 12b is provided to the base station 12 and the master station 10 allocates mobile stations 14 according to a carrier sense result from each mobile station 14 at the base station 12.

Signal Frame Configuration

Figure 24:
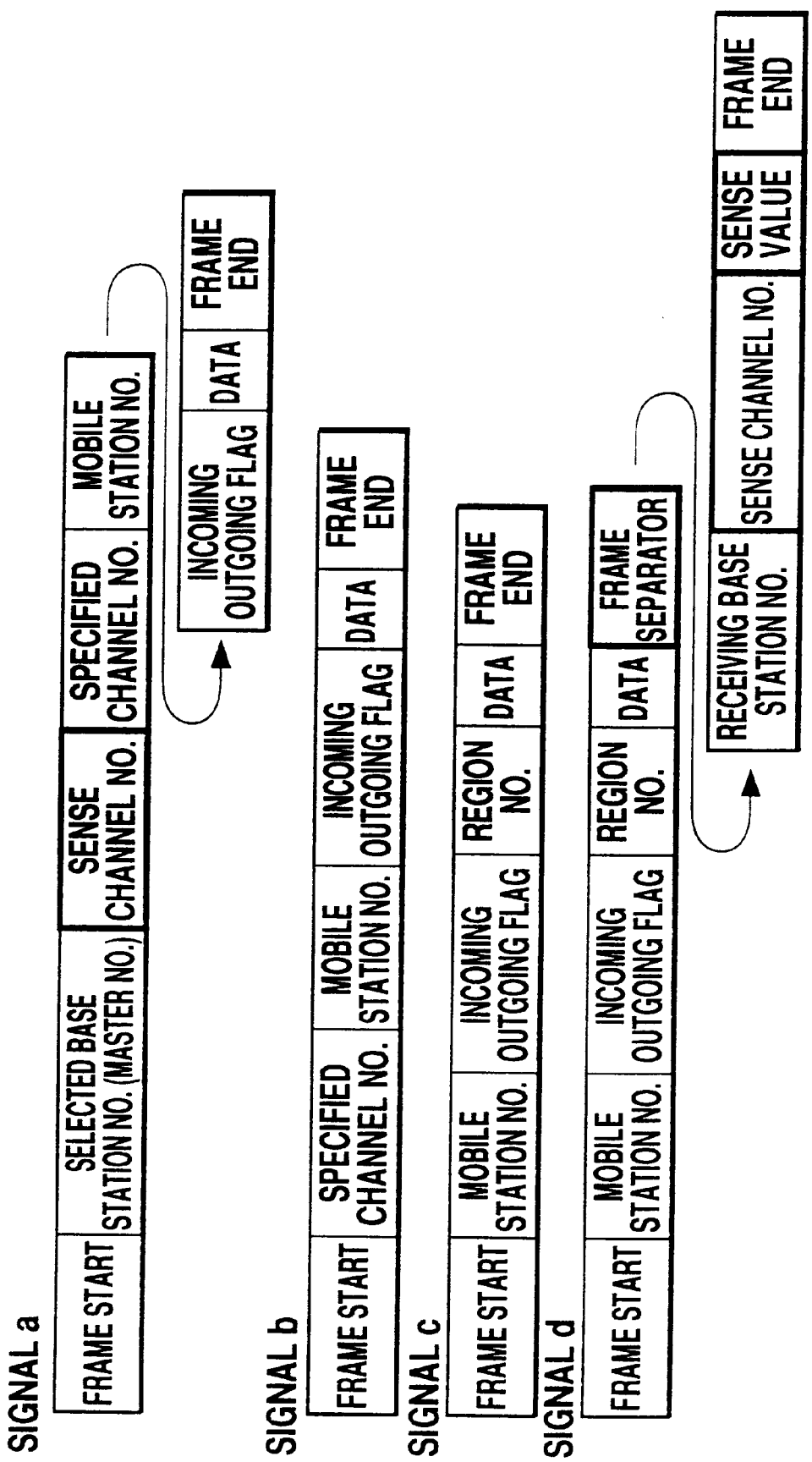
FIG. 24 is an explanatory diagram depicting a frame configuration of a signal in a polling communication.

FIG. 24 depicts a signal frame configuration in the present embodiment. In the present embodiment, the master station instructs the base station on which channel carrier sensing should be carried out and the base station sends back a sense value which is the carrier sensing result to the master station. Therefore signal a which is sent from the master station to the base station includes a sense channel number. Signals b and c sent respectively from the base station to the mobile station and from the mobile station to the base station do not include data concerning carrier sensing. Signal d which is sent from the base station to the master station includes a sense channel number and sense value data. Consequently, the result of carrier sensing carried out by the base station is transmitted to the master station upon transmission of a polling reply.

In signal d, frame separator data is included in the data followed by a receiving base station number, a sense channel number and a sense value and data from the master station and data from the base station are divided so as to facilitate processing at the master station.

Setting Table

A setting table consists of the channel setting table shown in FIGS. 5 (A) and (B) and a region setting table. In addition it also contains the base station distribution table shown in FIG. 25. This base station distribution table stores master numbers of adjacent base stations in other words the master numbers of base stations to which mobile stations are likely to be able to execute communication simultaneously. Therefore in response to this base station distribution table the master station specifies a sense channel number for carrying out carrier sensing at each base station and thus effective carrier sensing can be carried out.

Control Table

As in the first embodiment, the control table has a base station registration table, a polling registration table and a polling specification table; only the polling specification table differs from the first embodiment and this is shown in FIG. 26.

In the present embodiment a sense channel is specified when polling specification is executed. The master station determines this sense channel based on the base station distribution table described above and it is written in the polling specification table.

In other words, a sense channel number and a sense mobile station number are written for every selected base station. In this example, communication is carried out between selected base station #1 and mobile station %1 using channel f1, but here base station #1 executes carrier sensing of a polling reply sent to the adjacent base station #6 by mobile station %2 using channel f6. Thus a sense channel number f6 and a sense mobile station number %2 are specified in the selected base station #1 column of the polling specification table. Similarly, carrier sensing is executed at base station #2 to channel f3 from mobile station %4, at base station #2 to channel f3 from mobile station %4, at base station #3 to channel f3 from mobile station %4, at base station #4 to channel f3 from mobile station %4, at base station #5 to channel f4 from mobile station %5, and at base station #6 to channel f6 from mobile station %2. Sense channel f0 indicates no sensing in which case the sense mobile station number is set at %0.

Carrier Sense Registration Table

FIG. 27 depicts a carrier sense value registration table. The sense values of every mobile station for each base station are registered in this carrier sense value registration table. In the present example, since one channel is allocated to each base station and the carrier sense result is identical whether carrier sensing is executed at the mobile station or at the base station, FIG. 27 is essentially the same as FIG. 7.

Master Station Processing

Figure 28:
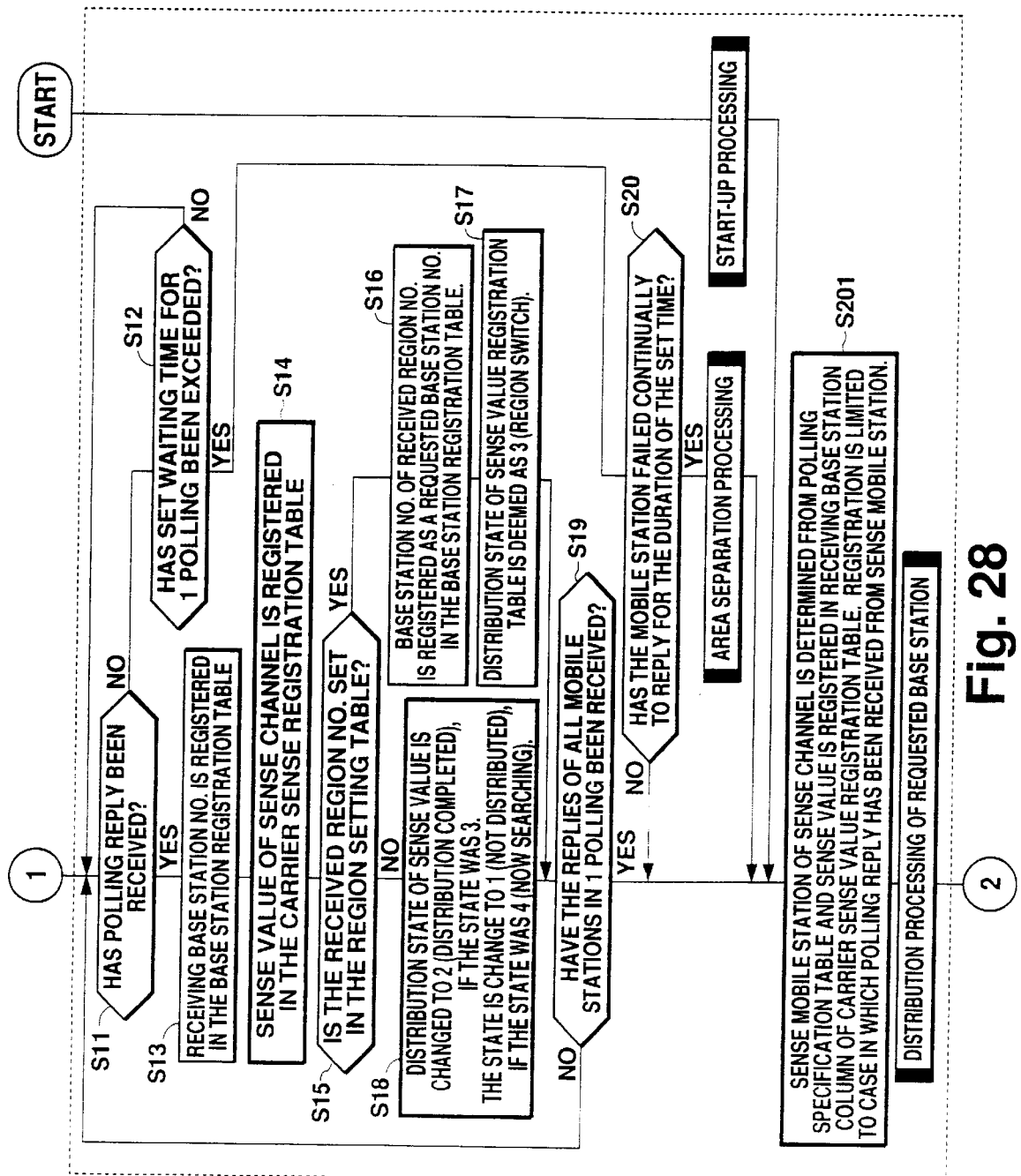
FIG. 28 is a flowchart of processing at a master station.

FIG. 28 depicts a master station processing operation for determining a requested base station corresponding to FIG. 8. The registering operation in the carrier sense registration table in FIG. 8 is omitted in this processing and instead S201 is provided. In S201 a sense mobile station for a sense channel is determined from the polling registration table and a sense value is registered in the receiving base station column for use with carrier sense value registration. This registration is limited here to a case in which the polling reply from the sense mobile station has been received. Thus the sense values of each mobile station which constitute the carrier sense results at the base station are registered in the carrier sense registration table. S201 processing is carried out immediately prior to requested base station distribution processing.

Figure 29:
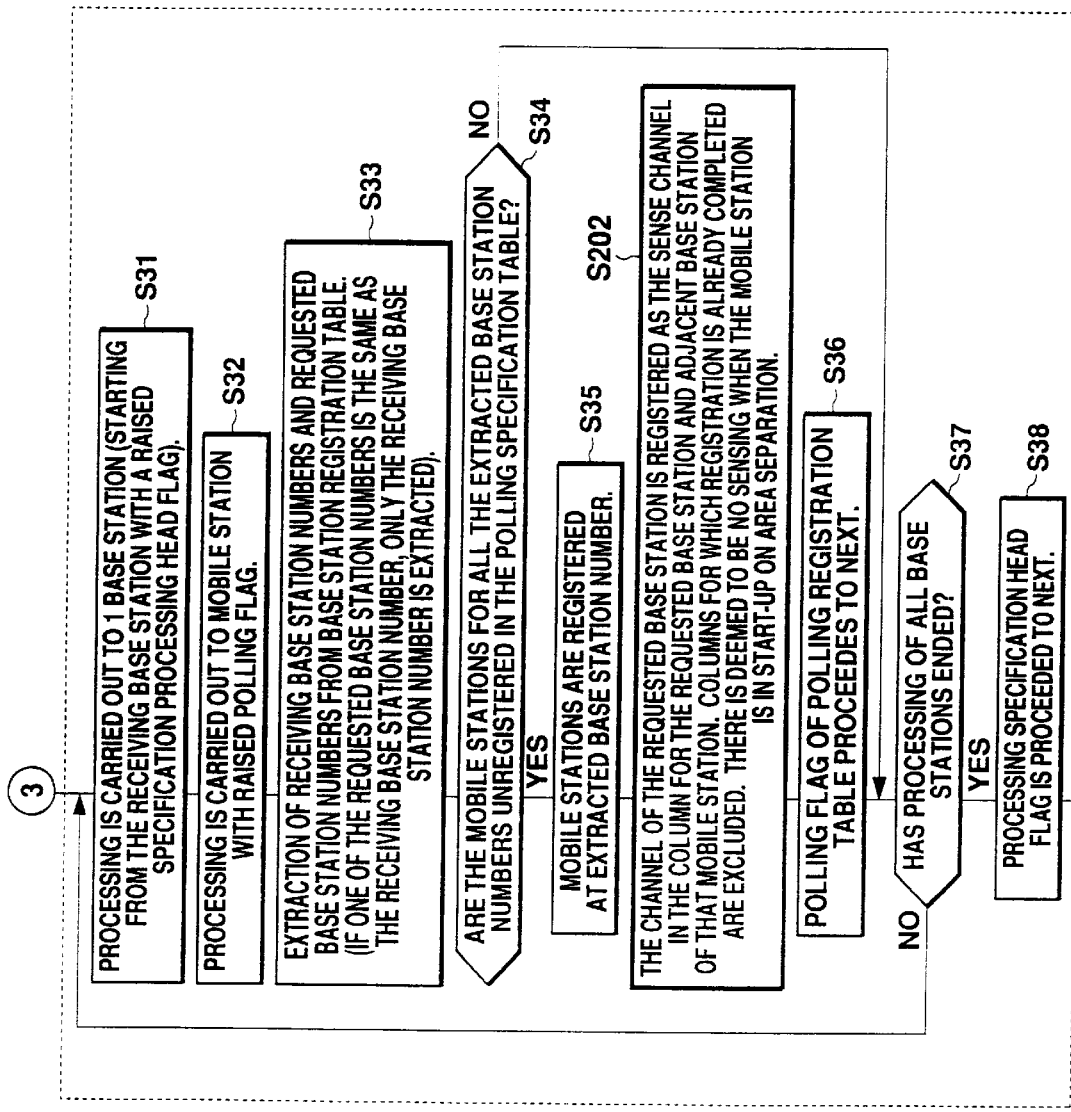
FIG. 29 is a flowchart of processing at a master station.

Processing shown in FIG. 9 executed after requested base station distribution processing is the same in this example. FIG. 29 depicts a case in which the receiving base station and requested base station shown in FIG. 10 differ. In the present example, S202 is inserted between S35 and S36 in this processing. In S202, the channel of the requested base station obtained is registered as the sense channel in the column[s] in the polling specification table for the requested base station and the adjacent base stations of the mobile station registered in S35 at the selected base station. Columns for which registration has already been completed are excluded here. In addition, there is deemed to be no sensing in a case in which that mobile station is in start-up or area separation. For instance, if the mobile station in S202 is mobile station %2 and its requested base station is #3, sense channel f3 and sense mobile station number %4 are registered at requested base station #3 and adjacent base stations #2 and #4. Consequently, carrier sensing around the requested base station is executed in the next polling and appropriate levelling is carried out. Subsequent processing at the master station is the same as that depicted in FIG. 11 and polling transmission is executed.

Requested Base Station Distribution Processing

Figure 30:
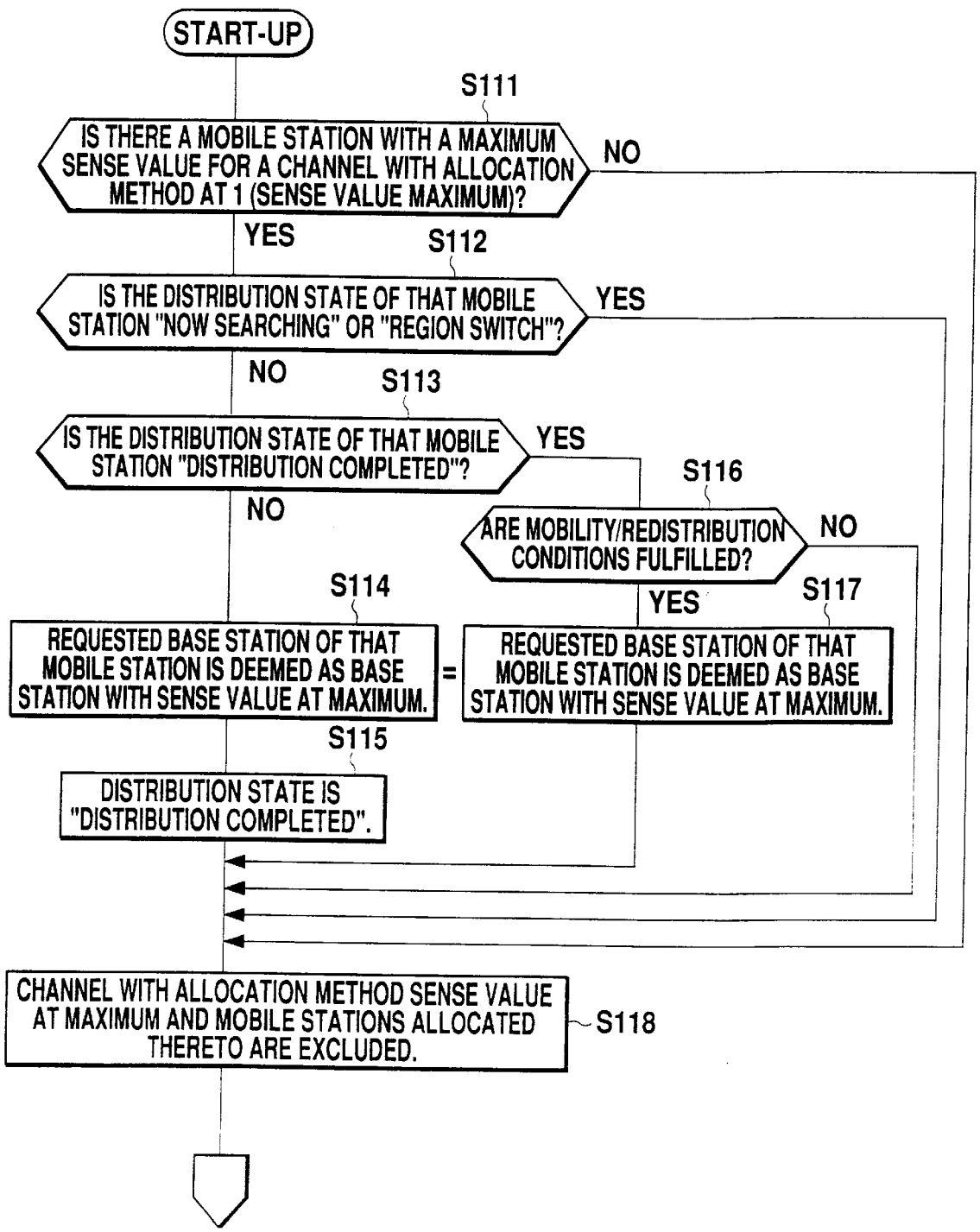
FIG. 30 is a flowchart of distribution processing of a requested base station.
Figure 31:
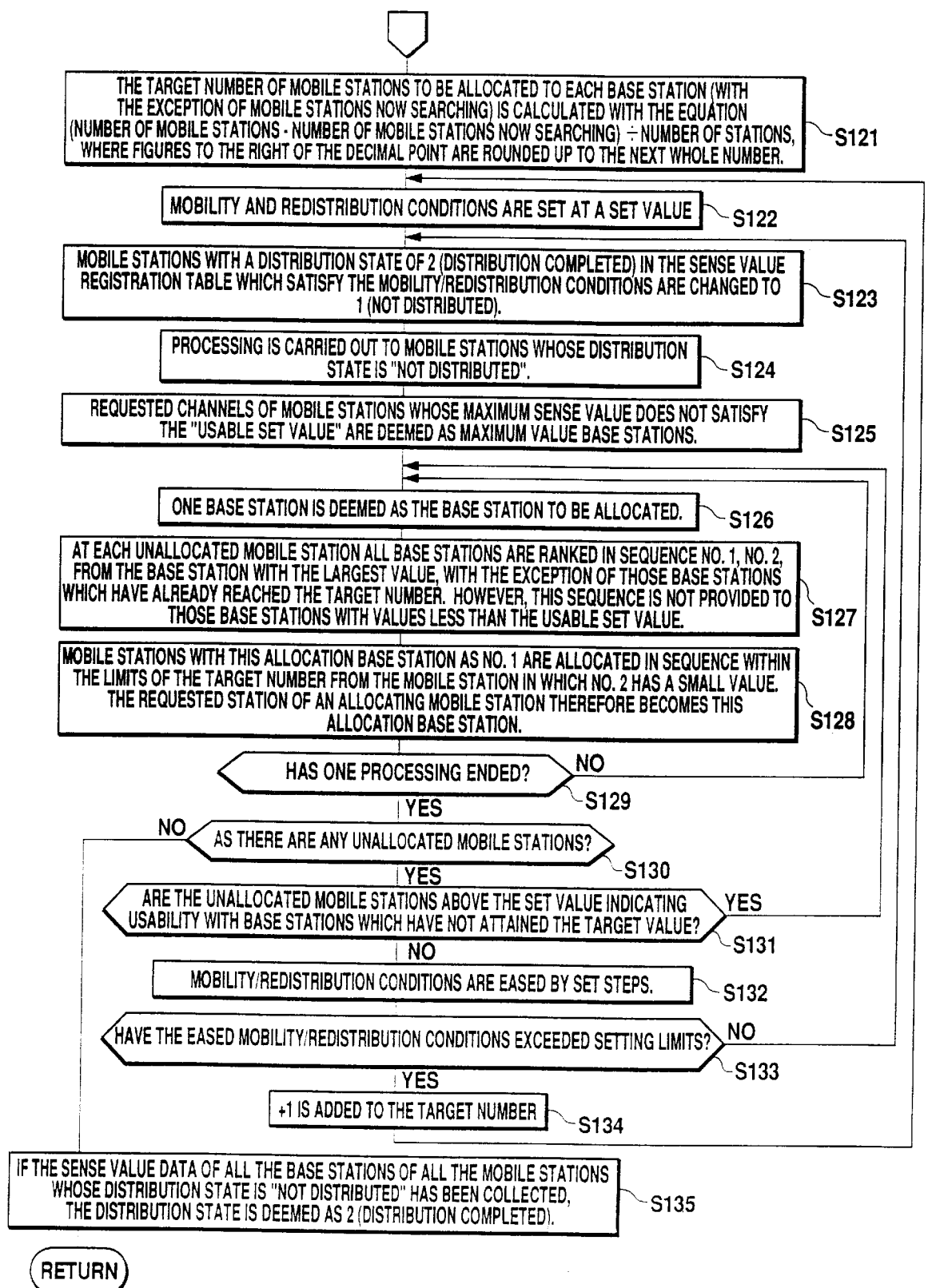
FIG. 31 is a flowchart of distribution processing of a requested base station.

Distribution processing of requested base stations in the present example is shown in FIGS. 30 and 31. This processing corresponds to the processing depicted in FIGS. 12, 13 in the first embodiment and is identical to those diagrams, apart from the fact that the processing carried out for each channel is carried out for each base station. Since processing is carried out for each base station, processing to make the channel at S136 in FIG. 13 correspond with a base station is not required and is therefore omitted.

Start-up Processing, Area Separation Processing

Start-up processing and area separation processing are otherwise identical with those of the first embodiment.

Mobile Station Processing

Figure 32:
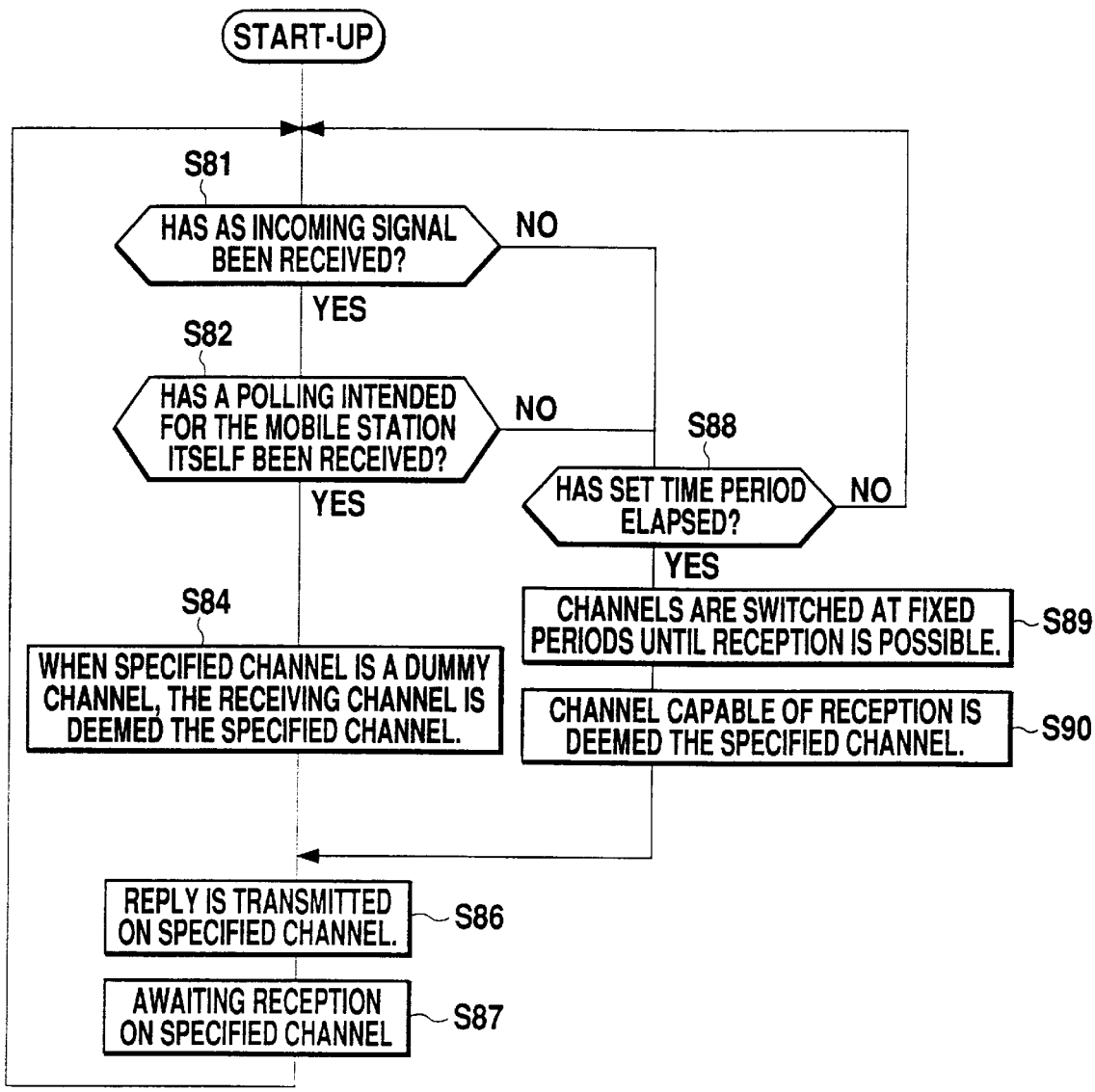
FIG. 32 is a flowchart showing mobile station control.

Mobile station processing is shown in FIG. 32. Carrier sensing is not carried out at the mobile stations in the present example. Consequently the processing at S83, S85 and S91 shown in FIG. 18 is omitted here. However, in all other respects, the processing here is identical.

Communication Timing

Since the base station now executes carrier sensing, the data within the signal frame is different, but timing is essentially identical with the first embodiment.

In a polling transmission at S50 in the first embodiment, due to carrier sensing at the mobile stations it was necessary to execute a transmission even when there was no mobile station served. However, in the present embodiment the signal b radio transmission is not necessary since a base station may execute carrier sensing based on a polling reply from a mobile station. Consequently, in a signal transmitted to a base station with no mobile stations to execute polling, the specified channel number and mobile station number and data of signal a shown in FIG. 24 are changed to dummy numbers and dummy data.

In addition, the base station awaits reception on the channel specified by the signal a sense channel at the carrier sensor 12b and after receiving an outgoing signal the base station transmits the received data of that base station's communications channel together with the sense value to the master station. When the frame is a dummy frame, only the sense value is transmitted to the master station after a fixed time period from the start of the frame. If there has been no reception on the communications channel (polling reply reception) of that base station by a fixed period after the start of the frame due to the existence of another base station with an identical master number or an error such as a communications error, only the sense value is transmitted to the master station. Moreover, when the sense channel is specified as "no sensing", a sense value of 999 is transmitted to the master station.

Other Explanations

Other configurations of the second embodiment will next be explained.

(i) In the above embodiment, when carrier sensing is executed at a base station, the receiving data of the carrier sense frequency is translated and the incoming data is identified. As a result, provided that the base stations execute carrier sensing in the channel sequence specified, each base station can also carry out polling to its own independent timing. In such a case, broadcast polling need only be executed when polling is executed by a plurality of base stations to a single mobile station during base station switching. Exempting polling failures during switching, polling during switching can also be executed independently by switching mobile station channels after transmission.

(ii) If frame lengths for a single polling are made the same and carrier sensing is executed at a fixed time from the frame end, translation of data received of the sense channel can be omitted.

(iii) The base station distribution table can be discarded and all the base stations can be treated as adjoining base stations. In such a case, it takes considerable time to collect the data required for executing switching because the time taken for a base station to complete one full carrier sensing of its mobile stations is longer. Consequently, the communications area crossover must be lengthened.

(iv) When broadcast polling is carried out by base stations which all have the same master number, the channel of the communications transmitter/receiver can be switched to the sense channel after an incoming radio transmission and carrier sensing can be carried out. In this case, there is no need for a carrier sense receiver.

(v) When a plurality of base stations are established in the same communications area and this group of base stations is registered beforehand and the registered base station of a region switch is registered in this group, levelling can be allocated to a base station to be used with base stations within this group. As a result, levelling can be allocated to a base station in a region switch.

(vi) When a star combination is utilized, base stations with the same master number must have separate radio lines in order to send sense value replies.

Preferred Embodiments of the Invention

As described above, the present invention is characterized in that it has the following configurations:

In a first embodiment of the present invention, a mobile station transmits receiving states of radio waves sent from a plurality of base stations to a master station and from the receiving states the master station identifies the next base station to be used by the mobile station.

In second embodiment of the present invention, a base station transmits receiving states of radio waves sent from a plurality of mobile stations to a master station and from the receiving states the master station identifies the next base station to be used by the mobile station.

The following configurations may also preferably be combined with the abovementioned characteristic configurations:

(1) the next base station to be used by the mobile station is compared with a base station which has received a polling reply from that mobile station and polling is executed to the relevant mobile station via both base stations until both stations match.

(2) identification information for the next base station which the master station has identified to be used by that mobile station is transmitted to the mobile station and the mobile station is instructed to switch the base station returning the polling reply.

(3) the next base station to be used by a mobile station is determined so that levelling between base stations is carried out to the number of mobile stations using the same base station at a range in which the carrier receiving state is favorable.

(4) communication is carried out by switching between a carrier sense levelling system at a range in which carrier receiving states are favorable wherein the next base station to be used by a mobile station is identified so that levelling between base stations is carried out to the number of mobile stations using the same base station, and a region allocating system in which a mobile station transmits its own position and determines a base station allocated beforehand based on that position, and the master station obtains identification data of the next base station to be used.

(5) communication is carried out by switching between a carrier sense levelling system at a range in which carrier receiving states are favorable wherein the next base station to be used by a mobile station is identified so that levelling between base stations is carried out to the number of mobile stations using the same base stations and a carrier sense maximum value system wherein a base station having the most favorable carrier receiving state is deemed as the next base station to be used.

While there has been described what are at present considered to be preferred embodiments of the invention, it will be understood that various modifications may be made to the present invention and it is intended that the appended claims cover all such modifications as fall within the true spirit and scope of the invention.

What is claimed is:

1. A mobile communications system, comprising:

a master station and a plurality of mobile stations, the master station and the mobile stations being configured to exchange communications in a polling system through a plurality of base stations and the mobile stations being further configured to execute movements based on instructions contained in communications from the master station, wherein each base station is configured to transmit radio waves, each mobile station is further configured to detect a result indicating a receiving state relative to the radio waves received from the base stations and to transmit the detected result to the master station via at least one of the base stations presently providing the exchange of communications, and the master station is further configured to determine at least one of the base stations to next provide the exchange of communications based on the detected result transmitted from each mobile station.

2. A mobile communications system, comprising:

a master station and a plurality of mobile stations, the master station and the mobile stations being configured to exchange communications in a polling system through a plurality of base stations, wherein each base station is configured to transmit radio waves, each mobile station is further configured to detect a result indicating a receiving state relative to the radio waves received from the base stations and to transmit the detected result to the master station via at least one of the base stations presently providing the exchange of communications, and the master station is further configured to determine at least one of the base stations to next provide the exchange of communications based on the detected result received from each mobile station and on how many mobile stations are presently exchanging communications through each base station.

3. A mobile communications system, comprising:

a master station and a plurality of mobile stations, the master station and the mobile stations being configured to exchange communications in a polling system through a plurality of base stations, wherein each base station is configured to transmit radio waves, each mobile station is further configured to detect a result indicating a receiving state relative to the radio waves received from the base stations and to transmit the detected result to the master station via at least one of the base stations presently providing the exchange of communications, and the master station is further configured to determine at least one base station to next provide the exchange of communications based on the detected result transmitted from each mobile station, to determine how many mobile stations are presently exchanging communications through each base station and to reduce disparity relative to how many of the mobile stations are presently exchanging communications through each base station.

4. The system according to claim 3, wherein
the master station determination of the at least one base station to next provide the exchange of communications includes determining which base stations have minimum acceptable receiving states as indicated by the received detected result.

5. The system according to claim 1, wherein
the base station through which a particular mobile station executes communications is changed by the master station to accompany movement of the particular mobile station by the master station comparing the receiving states of the base stations along a path of movement of the particular mobile station based upon the received detected result and communicates with the particular mobile station via at least two adjacent base stations along the path at least until the receiving states of the two adjacent base stations both match.

6. The system according to claim 1, wherein
the master station is further configured to transmit information identifying the at least one base station to each relevant mobile station along with an instruction to the relevant mobile station to exchange communications through the identified at least one base station.

7. A mobile communications system, comprising:
a master station and a plurality of mobile stations, the master station and the mobile stations being configured to exchange communications in a polling system through a plurality of base stations, wherein
each base station is configured to transmit radio waves,
each mobile station is further configured to detect a result indicating a receiving state relative to the radio waves received from the plurality of base stations and to transmit the detected result to the master station via at least one of the base stations presently providing the exchange of communications, and
the master station is further configured to switch a determination of at least one base station to continue to provide the exchange of communications between a determination based on the detected result indicating that a particular mobile station has a position that permits selection of several base stations as the at least one base station and the at least one base station is selected so as to equalize loading between the several base stations in terms of maintaining a relatively equal number of mobile stations exchanging communications through each of the several base stations and a region allocation determination in which a mobile station transmits a mobile station position to the master station which then determines the at least one base station based on the mobile station position and known base station positions.

8. A mobile communication system, comprising:
a master station and a plurality of mobile stations, the master station and the mobile stations being configured to exchange communications in a polling system through a plurality of base stations, wherein
each base station is configured to transmit radio waves,
each mobile station is further configured to detect a result indicating a receiving state of the radio waves received from the plurality of base stations and to transmit the detected result to the master station via at least one of the base stations presently providing the exchange of communications, and
the master station is further configured to switch a determination of at least one base station to continue to provide the exchange of communications between a determination based on the detected result indicating that a particular mobile station has a position that permits selection of several base stations as the at least one base station and the at least one base station is selected so as to equalize loading between the several base stations in terms of maintaining a relatively equal number of mobile stations exchanging communications through each of the several base stations and a determination in which the at least one base station is selected by the master station based on the detected result indicating that a particular base station has a most favorable receiving state.

9. A mobile communications system, comprising:
a master station and a plurality of mobile stations, the master station and the mobile stations being configured to exchange communications in a polling system through a plurality of base stations and the mobile stations being further configured to execute movements based on instructions contained in communications from the master station, wherein
each base station is configured to receive radio waves transmitted from the mobile stations, to detect results indicating receiving states of the radio waves, and to transmit the detected results to the master station, and
the master station is further configured to determine which base station to select for the exchange of communications with each mobile station based on the detected results received from each base station.

10. A mobile communications system, comprising:
a master station and a plurality of mobile stations, the master station and the mobile stations being configured to exchange communications in a polling system through a plurality of base stations, wherein
each base station is configured to receive radio waves transmitted from the mobile stations, to detect results indicating receiving states of the radio waves, and to transmit the detected results to the master station, and
the master station is further configured to determine which base station to select for the exchange of communications with each mobile station based on the detected results received from each base station and on how many mobile stations are exchanging communications with the master station through each base station.

11. The system according to claim 10, wherein
the master station determines which base station to select for the exchange of communications with each mobile station based on the detected results received from each base station and reducing any disparity between base station loading in terms of how many mobile stations are exchanging communications with the master station through each base station.

12. The system according to claim 11, wherein
the master station determines which base station to select from several base stations determined to have minimum acceptable receiving states as indicated by the received detected results.

13. The system according to claim 12, wherein
the base station through which a particular mobile station exchanges communications is changed by the master station to accompany movement of the particular mobile station by the master station comparing receiving signal states of adjacent base stations along a path of movement of the mobile station while exchanging communications using said adjacent base station at least until the receiving states of the adjacent base stations match as indicated by the detected results.

14. The system according to claim 9, wherein
the master station transmits information identifying the base station selected for the exchange of communications and an instruction to the mobile station for exchanging communications through the selected and identified base station.

15. A mobile communications system, comprising:
a master station and a plurality of mobile stations, the master station and the mobile stations being configured to exchange communications in a polling through a plurality of base stations, wherein
 each base station is configured to receive radio waves transmitted from the mobile stations, to detect results indicating receiving states of the radio waves, and to transmit the detected results to the master station, and
 the master station is further configured to switch a determination of at least one base station to next provide the exchange of communications between a determination based on the detected results indicating that a particular mobile station has a position that permits selection of several base stations as the at least one base station and the at least one base station is selected so as to equalize loading between the several base stations in terms of maintaining a relatively equal number of mobile stations exchanging communications through each of the several base stations and a region allocation determination in which a mobile station transmits a mobile station position to the master station which then determines the at least one base station based on the mobile station position and known base station positions.

16. A mobile communications system, comprising:
a master station and a plurality of mobile stations, the master station and the mobile stations being configured to exchange communication in a polling system through a plurality of base stations, wherein
 each base station is configured to received radio waves transmitted from the mobile stations, to detect results indicating receiving states of the radio waves, and to transmit the detected results to the master station, and
 the master station is further configured to switch a determination of at least one base station to next provide the exchange of communication between a determination based on the detected results indicating that a particular mobile station has a position that permits selection of several base stations as the at least one base station and the at least one base station is selected so as to equalize loading between the several base stations in terms of maintaining a relative equal number of mobile stations exchanging communications through each of the several base stations and a determination in which the at least one base station is selected by the master station based on the detected results indicating that a particular base station has a most favorable receiving state.

17. A mobile communication system, comprising:
a master station and a plurality of mobile stations, the master station and the mobile stations being configured to exchange communications in a polling system through a plurality of base stations and the mobile stations being further configured to execute movements based on instructions contained in communications from the master station, wherein
 each base station is configured to communicate with to the mobile stations and
 the master station determines which base station to use for the exchange of communications with each mobile station in accordance with the communications state of each mobile station and each base station.

\* \* \* \* \*